US012645452B2

(12) United States Patent
Bienkowski et al.

(10) Patent No.: US 12,645,452 B2
(45) **Date of Patent: \*Jun. 2, 2026**

(54) IN-DATABASE APPLICATION PACKAGE UPDATING

(71) Applicant: Snowflake Inc., Bozeman, MT (US)

(72) Inventors: Karol Pawel Bienkowski, Toronto (CA); Damien Carru, New York, NY (US); Jeremy Yujui Chen, Newark, CA (US); Pui Kei Johnston Chu, Richmond Hill (CA); Benoit Dageville, San Mateo, CA (US); Scott C. Gray, Richmond Hill (CA); Unmesh Jagtap, San Mateo, CA (US); Subramanian Muralidhar, Mercer Island, WA (US)

(73) Assignee: Snowflake Inc., Bozeman, MT (US)

( \* ) Notice: Subject to any disclaimer, the term of this patent is extended or adjusted under 35 U.S.C. 154(b) by 111 days.

This patent is subject to a terminal disclaimer.

(21) Appl. No.: 18/525,359

(22) Filed: Nov. 30, 2023

(65) Prior Publication Data

US 2024/0272900 A1 Aug. 15, 2024

Related U.S. Application Data

(63) Continuation of application No. 18/169,812, filed on Feb. 15, 2023, now Pat. No. 11,886,872.

(51) Int. Cl.
*G06F 8/71* (2018.01)
*G06F 9/448* (2018.01)

(52) U.S. Cl.
CPC .............. *G06F 8/71* (2013.01); *G06F 9/4488* (2018.02)

(58) Field of Classification Search
CPC ................................. G06F 8/71; G06F 9/4488
See application file for complete search history.

(56) References Cited

U.S. PATENT DOCUMENTS

| | | | |
|---|---|---|---|
| 10,652,300 B1 * | 5/2020 | Simukka ................. | H04L 65/70 |
| 11,601,464 B2 | 3/2023 | Viswanathan et al. | |
| 11,620,142 B1 | 4/2023 | Friis | |
| 11,625,502 B2 | 4/2023 | Barday et al. | |
| 11,882,008 B1 * | 1/2024 | Karl .................... | H04L 41/5009 |

(Continued)

OTHER PUBLICATIONS

U.S. Appl. No. 18/169,812, filed Feb. 15, 2023, In-Database Application Package and Application.

(Continued)

*Primary Examiner* — Ziaul A Chowdhury
(74) *Attorney, Agent, or Firm* — Schwegman Lundberg & Woessner, P.A.

(57) ABSTRACT

An in-database application package and application instance for a data platform. The data platform creates an application instance of an application package having a versioned schema, creates one or more system roles for the application instance, creates a user role and an administrator role for the application instance, creates one or more objects of the application instance based on a versioned schema, and grants one or more use privileges to the one or more roles. Application instances of the application package are upgraded or patched on the data platform based on application package versions. To ensure a proper upgrade or patch, the data platform tracks versions of executing objects of application instances in a call context.

30 Claims, 15 Drawing Sheets

(56) References Cited

U.S. PATENT DOCUMENTS

| | | | | |
|---|---|---|---|---|
| 11,886,872 | B1 | 1/2024 | Bienkowski et al. | |
| 12,197,402 | B1* | 1/2025 | Alexander | G06F 16/258 |
| 2014/0040979 | A1 | 2/2014 | Barton et al. | |
| 2014/0095432 | A1* | 4/2014 | Trumbull | G06F 16/219 |
| | | | | 707/610 |
| 2014/0282469 | A1 | 9/2014 | Johnson et al. | |
| 2015/0370551 | A1 | 12/2015 | Mahajan | |
| 2019/0026321 | A1* | 1/2019 | Mukhopadhyay | G06F 16/23 |
| 2021/0342322 | A1* | 11/2021 | Rielau | G06F 16/211 |
| 2021/0365577 | A1 | 11/2021 | Acharya et al. | |
| 2022/0360463 | A1 | 11/2022 | Wilson et al. | |
| 2023/0087066 | A1* | 3/2023 | Lueders | G06F 16/2365 |
| | | | | 707/690 |
| 2023/0090190 | A1 | 3/2023 | Iila et al. | |

OTHER PUBLICATIONS

"European Application Serial No. 24157013.4, Extended European Search Report mailed Aug. 16, 2024", 8 pages.

"European Application Serial No. 24157013.4, Response Filed Mar. 14, 2025 to Extended European Search Report mailed Aug. 16, 2024", 117 pages.

"U.S. Appl. No. 18/169,812, Non Final Office Action mailed May 5, 2023", 13 pgs.

"U.S. Appl. No. 18/169,812, Response filed Aug. 7, 2023 to Non Final Office Action mailed May 5, 2023", 11 pgs.

"U.S. Appl. No. 18/169,812, Notice of Allowance mailed Sep. 18, 2023", 13 pgs.

Booch, Grady, "Object-oriented analysis and design with applications", (Sep. 2008), 2 pgs.

Foster, Ian, "Globus toolkit version 4: Software for service-oriented systems", (Jul. 2006), 8 pgs.

* cited by examiner

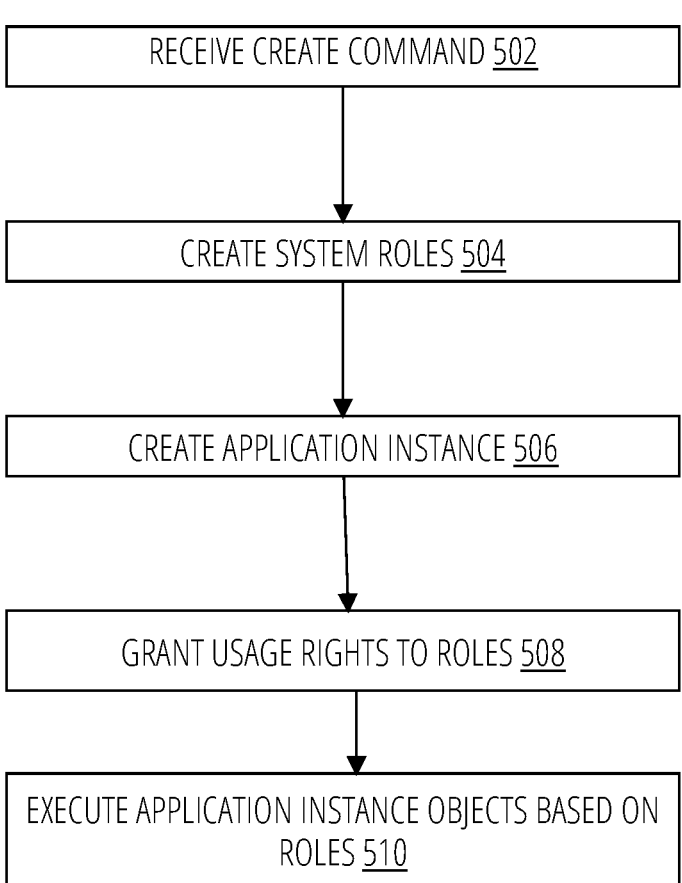
RECEIVE CREATE COMMAND 502
CREATE SYSTEM ROLES 504
CREATE APPLICATION INSTANCE 506
GRANT USAGE RIGHTS TO ROLES 508
EXECUTE APPLICATION INSTANCE OBJECTS BASED ON ROLES 510
FIG. 5

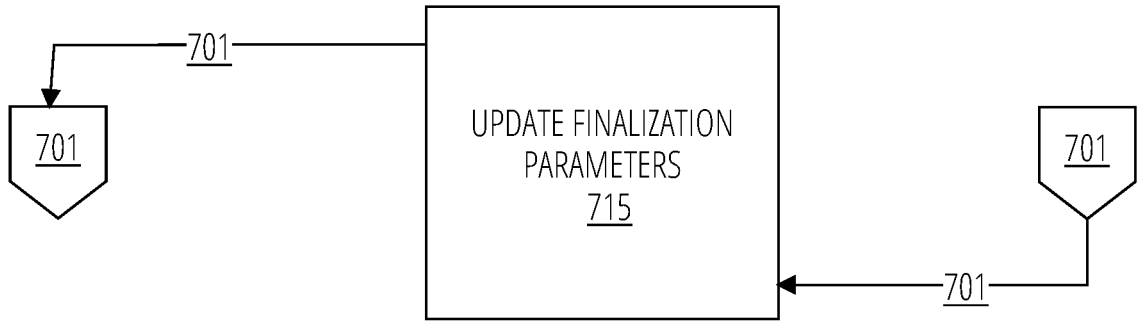
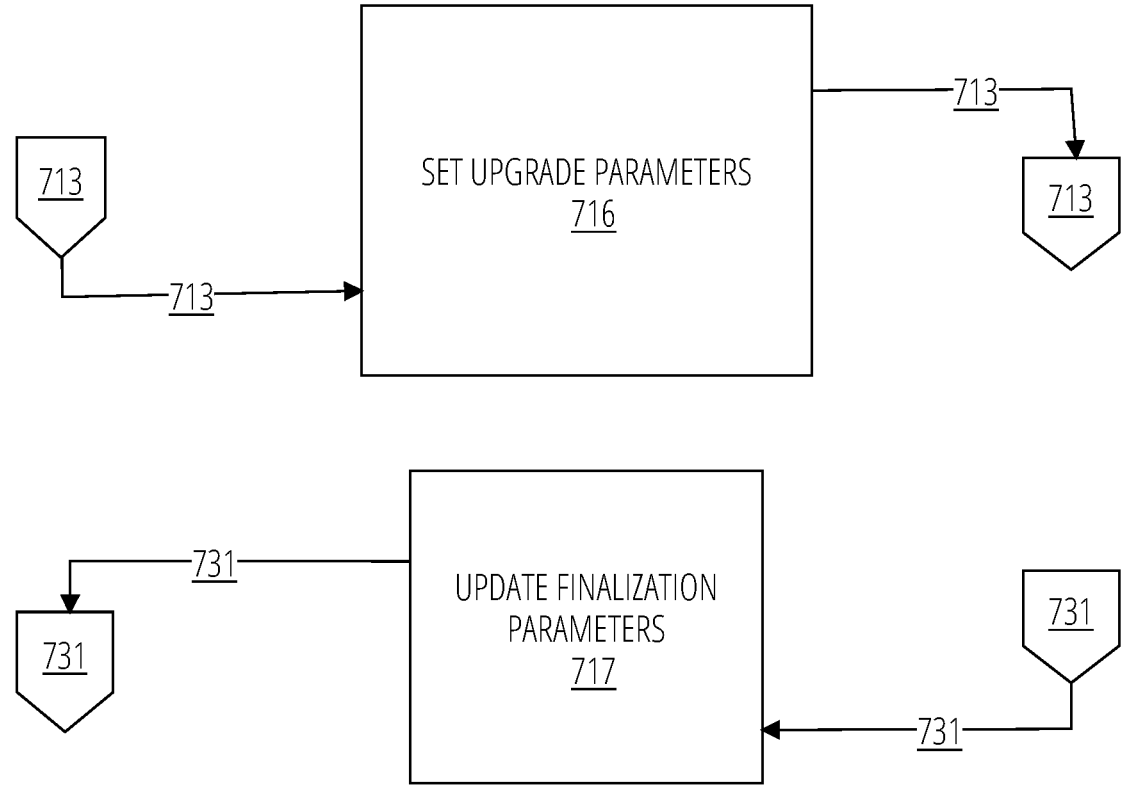
FIG. 7B

1000

DETERMINE, BY A FIRST PROCEDURE, A FIRST VERSION CONTEXT BASED ON A VERSIONED SCHEMA 1002

INVOKE, BY THE FIRST PROCEDURE, A SECOND PROCEDURE USING THE FIRST VERSION CONTEXT 1004

DETERMINE, BY THE SECOND PROCEDURE, A SECOND VERSION CONTEXT 1006

INVOKE, BY THE SECOND PROCEDURE, A THIRD PROCEDURE USING THE FIRST VERSION CONTEXT OF THE SECOND VERSION CONTEXT 1008

CALL OBJECT OF VERSIONED APPLICATION INSTANCE 1010

LOOK IN CALL CONTEXT FOR VERSION OF THE APPLICATION INSTANCE 1012

VERSION FOUND? 1014

DETERMINE VERSION OF THE APPLICATION INSTANCE AND ADD TO CALL CONTEXT 1016

1018 YES

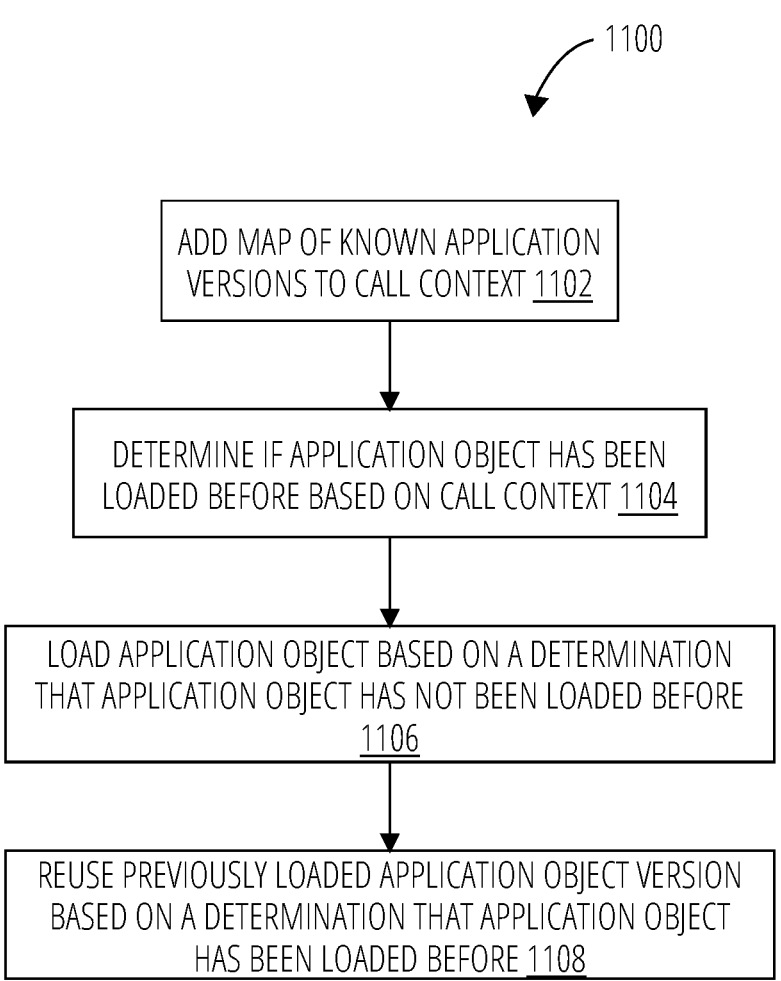

1100

ADD MAP OF KNOWN APPLICATION
VERSIONS TO CALL CONTEXT <u>1102</u>

DETERMINE IF APPLICATION OBJECT HAS BEEN
LOADED BEFORE BASED ON CALL CONTEXT <u>1104</u>

LOAD APPLICATION OBJECT BASED ON A DETERMINATION
THAT APPLICATION OBJECT HAS NOT BEEN LOADED BEFORE
<u>1106</u>

REUSE PREVIOUSLY LOADED APPLICATION OBJECT VERSION
BASED ON A DETERMINATION THAT APPLICATION OBJECT
HAS BEEN LOADED BEFORE <u>1108</u>

FIG. 11

IN-DATABASE APPLICATION PACKAGE UPDATING

PRIORITY CLAIM

This application is a Continuation of U.S. patent application Ser. No. 18/169,812, filed Feb. 15, 2023, the contents of which are incorporated herein by reference.

TECHNICAL FIELD

Examples of the disclosure relate generally to databases and, more specifically, to native applications of a data platform.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

BRIEF DESCRIPTION OF THE DRAWINGS

The present disclosure will be understood more fully from the detailed description given below and from the accompanying drawings of various examples of the disclosure.

FIG. 5 is an illustration of an instantiation and usage method, in accordance with some examples.

FIG. 7A, FIG. 7B, and FIG. 7C illustrate a state flow diagram of a versioned application package and schema installation and upgrade process, in accordance with some examples.

FIG. 11 is an illustration of another process flow diagram of a pinning or association process, in accordance with some examples.

DETAILED DESCRIPTION

Figure 1:
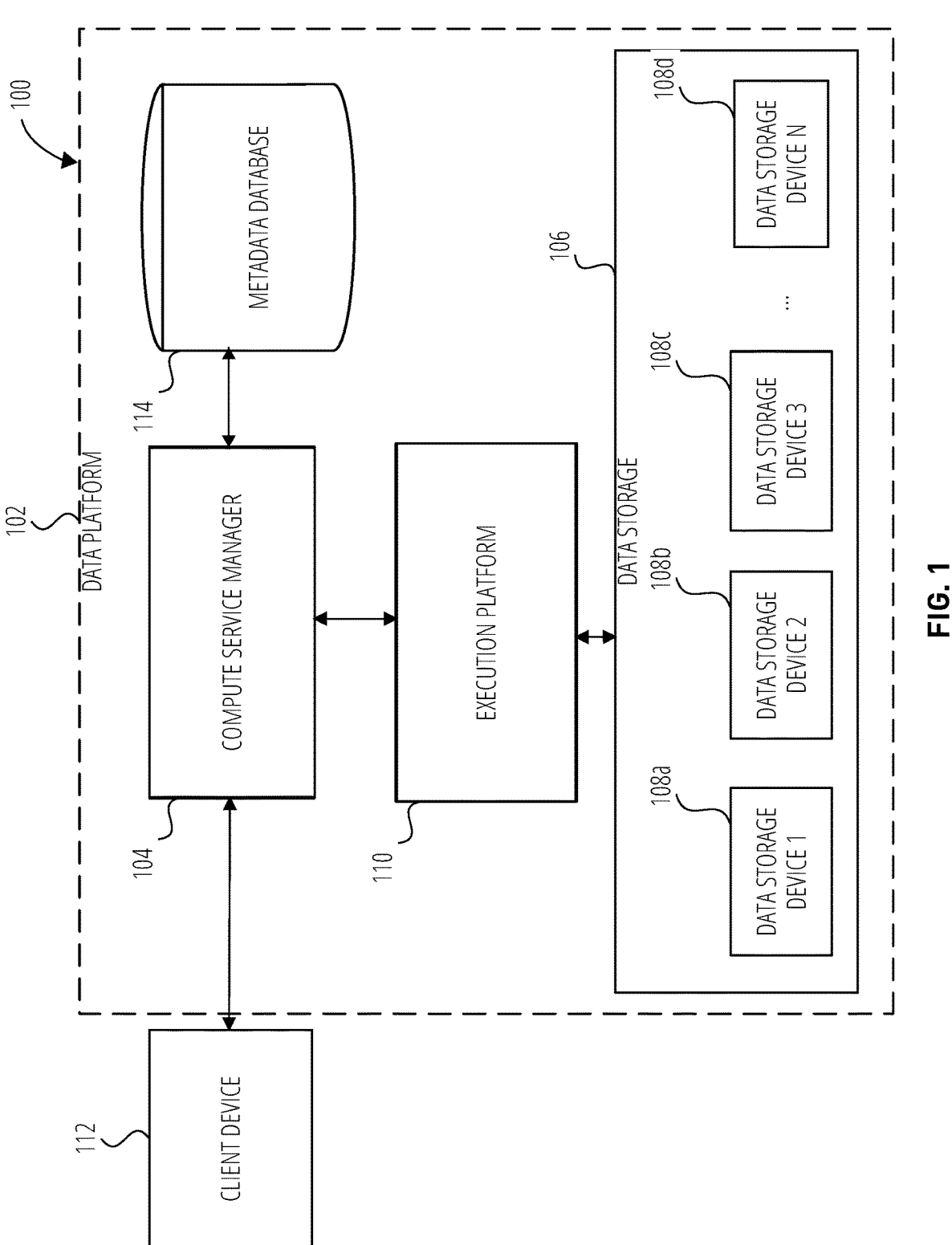
FIG. 1 illustrates an example computing environment that includes a network-based data platform in communication with a cloud storage provider system, in accordance with some examples.

Providers of data products on data platforms desire a way to update those products while those products are being provided to consumers and are still operating on the data platforms.

An update methodology should provide the ability for the development, global distribution, installation, execution of in-database applications built upon relational database primitives (such as tables, functions, stored procedures, roles, streams, tasks, etc.). A methodology should also provide fine grained security controls for consumers of the application, protect their data and environment from the application, as well as protect the intellectual property of the application developer.

Methodologies in accordance with this disclosure allow customers to develop full solutions around their proprietary data, expertise, and existing code artifacts (such as functions and stored procedures), as well as user interface components.

In some examples, the methodologies allow the marketing and distribution of applications within the application developers own organization, targeted to specific accounts or organizations, or globally.

In some examples, the methodologies also allow providers to monetize the use of their applications.

In some examples, applications execute within the customer's secure environment, for maximum performance.

In some examples, consumers of the application have explicit control of what permissions the running application has within their environment and running applications are isolated from the consumer's environment, protecting the consumer from malicious, rogue, or misbehaving applications.

In some examples, the methodologies provide the ability for application developers to modify, version, patch and release updates to their applications, controlling which accounts or organizations receive specific versions and allow for application upgrades to take place globally, asynchronously, and without impacting instances of the application that are in use at the time of upgrade.

In some examples, the content of a database schema is directly tied to the version of the database. At the time a user requests access to the schema, that request sees the contents of the schema (tables, views, procedures, functions, etc.) at the most recently installed version. At the completion of an upgrade process to the next version of the application, the contents of the schema immediately and atomically become visible, reflecting the new contents as dictated by the version of the application. Any request started prior to the completion of the upgrade will continue to see the contents of the schema as it was at the time the request began.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "named storage location" or "named storage locations"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 includes data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
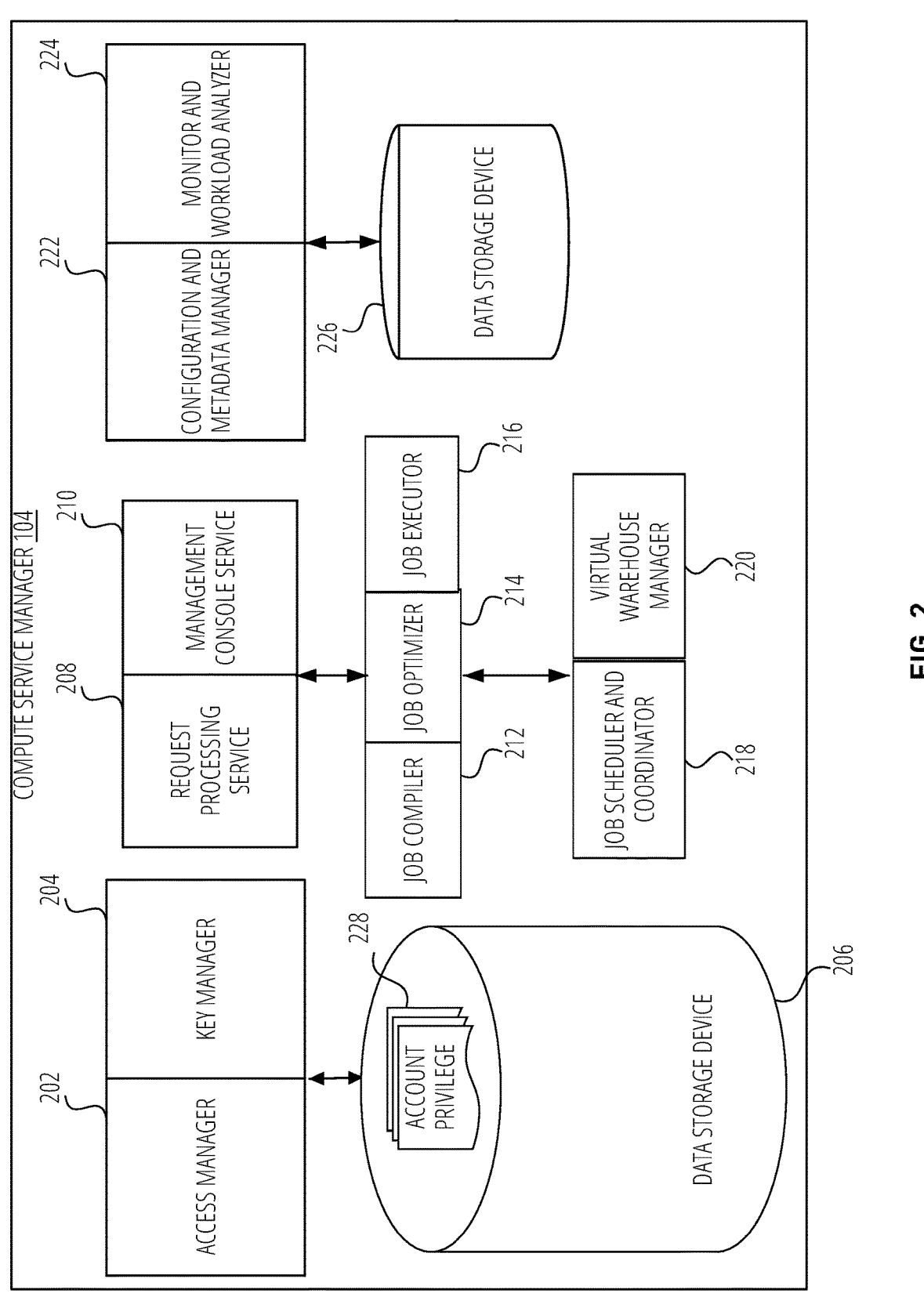
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

In some examples, the access manager 202 authorizes access to objects of the data platform 102 based on one or more sets of access privileges stored on the data storage device 206, such as a set of account privileges 228.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
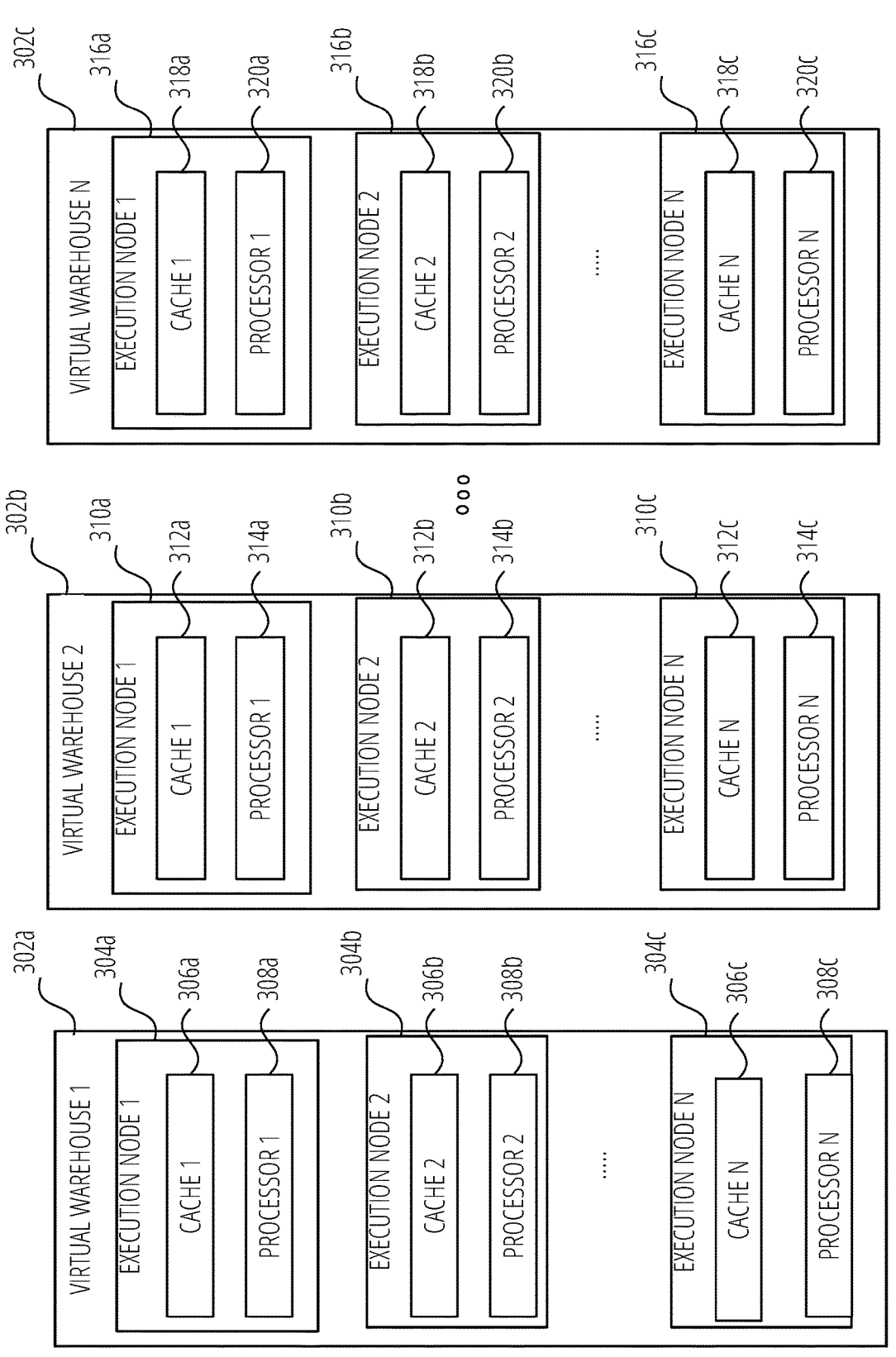
FIG. 3 is a block diagram illustrating components of an execution platform, in accordance with some examples.

FIG. 3 is a block diagram illustrating components of the execution platform 110 (of FIG. 1), in accordance with some examples. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 310a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
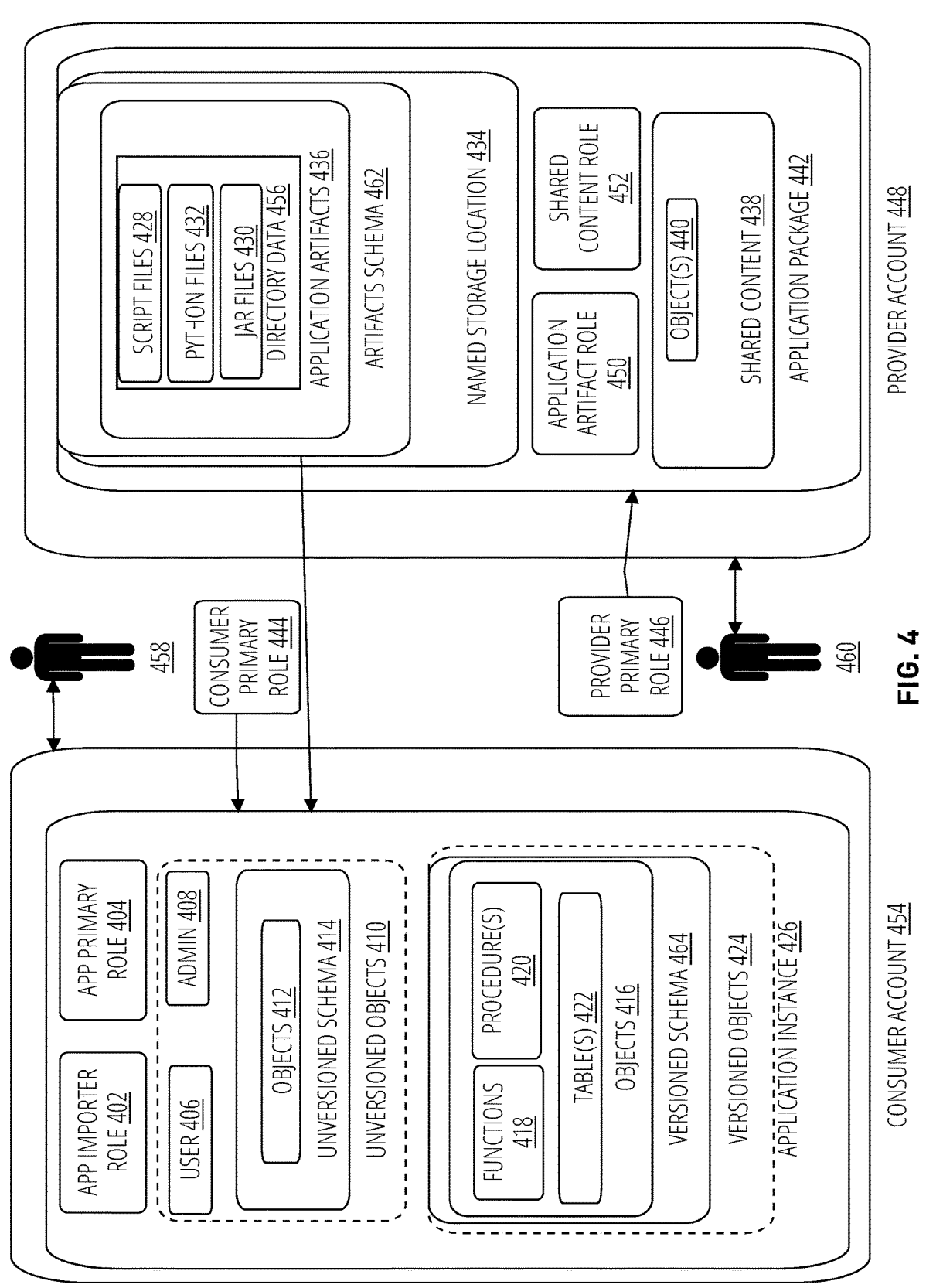
FIG. 4 is an illustration of an application package and an instantiation of the application package, in accordance with some examples.

FIG. 4 is an illustration of an application package and an instantiation of the application package, in accordance with some examples.

An application package 442 is used by a provider 460 having a provider account 448 to create a database application that can be provided to a consumer 458 having a consumer account 454. Once properly instantiated, such as application instance 426, the application can be executed by the consumer 458 in the consumer account 454 and access content off the application package that is shared to application instance 426 including one or more objects, such as objects 440, in a secure manner. In some examples, the consumer 458 can be their own provider, e.g., the consumer 458 can create application packages that are used by users of the consumer account 454. In a similar manner, the provider 460 can be their own consumer, e.g., the provider 460 can create application packages for use by users of the provider account 448.

In some examples, the application package 442 is an object that acts like a database and supports features provided by a database container. For example, use of the application package 442 provides for:

Creation of database roles and schemas.

Supports existing privileges of a database (e.g., USAGE, MONITOR, and the like).

A SHOW DATABASES command that returns database and application package objects; has a column indicating the underlying type of the object (e.g., if it is an application package or a plain database), and does not return properties specific to an application package 442.

A DESC DATABASE command that returns a list of schemas in the application package object.

A USE DATABASE command that would set a current session's database to the application package 442 database.

Support of properties specific to the application package object such as, but not limited to setup scripts and the like.

Support commands of: CREATE APPLICATION PACKAGE to create a package; DROP APPLICATION PACKAGE to delete an application package; SHOW APPLICATION PACKAGES to return all application package objects in a provider account 448; DESC APPLICATION PACKAGE to return any properties, generic or specific, defined on the application package 442.

Appearing in a systems catalog database view.

A consumer account 454 usage view of the application package view.

The application package 442 comprises one or more application artifacts 436 in the form of executable objects such as, but not limited to script files 428, python files 432, and jar files 430, that are stored in an application artifacts datastore such as a named filesystem scoped to a schema 462 associated with the provider account 448. In some examples, the datastore for the application artifacts 436 includes directory data 456 accessed by the consumer application instance 426 at run time in the consumer account 454 for storage of the executable files once the application instance 426 has been instantiated.

In some examples, the application artifacts 436 are defined in an artifact's schema 462. In some examples, the versioned artifacts schema contains script files 428 that are executed within the application instance 426 to define the application. Versioned schema, described more fully in reference FIG. 8 may be defined by the script files 428 to contain stateless objects.

In some examples, an application may have none or more application package versions that are containers for the artifact's schema 462 and the named storage location 434.

The application package 442 further comprises shared content 438 comprising one or more data objects, such as objects 440, that constitute objects shared to the application instance 426 that are accessed and/or operated on by the application instance 426 during execution of executable objects of the versioned schema 464 of the application instance 426 such as, but not limited to, functions 418 and procedures 420. In some examples, the application package includes shared content comprising one or more schemas containing objects such as, but not limited to, tables, views, and the like. In some examples, the shared content 438 is accessed by the application instance 426 based on a set of security protocols.

The application instance 426 comprises a set of versioned objects 424 that are created during the instantiation of the application instance 426. The versioned objects 424 include objects 416 of a versioned schema 464 that are defined by the application artifacts 436. In some examples, the objects 416 comprise one or more functions 418, one or more procedures 420, one or more tables 422, and the like.

The application instance 426 further comprises unversioned objects 410 that are not part of the application package 442 but are instead objects derived from data and programs that are unique to the consumer account 454 such as, but not limited to an unversioned schema 414 that defines objects 412. In some examples, the unversioned objects 410 are logically located in the consumer account 454 but owned by an application primary role 404. In some examples, the unversioned objects 410 further include a local state such as, but not limited to, data of a user role 406 and of an administrator role 408. In some examples, an application instance includes objects that are created by the setup script from the application package. These objects are not part of the application package and are not derived from the local state of the consumer account.

Roles are used to control access to the application artifacts 436 that compose the objects 416 of the application instance 426 and the one or more objects 440 of the shared content 438 of the application package 442. In addition, roles are used to control execution of the objects 416 by referencing the application artifacts 436. In some examples, a generic role is a role where the application package 442 is treated as a generic database where any standard objects can be created, and an application role is a role that is defined in a setup script and created in the application instance 426 during installation or upgrade operations. A role of either type may be owned by a consumer account 454, a provider account 448, or the data platform 102. A role of either type may be either visible or hidden to a consumer account 454, a provider account 448, or the data platform 102. A hidden role is a role that a user of the data platform 102 does not explicitly see and cannot modify but may implicitly use to gain access to or execute an object of the data platform 102. In some examples, application artifact role 450, shared content role 452, application importer role 402, and application primary role 404 are hidden roles.

In some examples, when the application package 442 is created it is implicitly owned by a provider primary role 446 of the provider 460. Thus, the application package 442 is owned by the primary role of the provider who created it. In a similar manner, when the consumer 458 instantiates the application instance 426, it is owned by the consumer 458 through a consumer primary role 444 of the consumer 458. In some examples, an application primary role 404 created and used as the owner of objects created within the application but not as the owner of the application instance itself.

In some examples, an application instance shares the same namespace as a database namespace, meaning that it will not be possible for a database and an application instance object to share the same name. An application instance functions as a database and supports features provided by that object type such as, but not limited to, creation of database roles, schemas, objects in the schemas by any authorized roles and support existing privileges of a database (e.g., usage, monitor, and the like). A show databases command returns database and application objects, has a column indicating the underlying type of the object (e.g., if it is an application or a plain database), but will not return properties specific to an application instance.

In some examples, an application instance object supports properties specific to the application instance object such as, but not limited to a firewall configuration property indicating where the application instance can connect to, and an event sharing property indicating if the logs generated by the application instance will be shared with the provider.

In some examples, the data platform 102 supports a create application command to create a new application instance, a drop application command to drop or delete an application instance, a show applications command returns all the application objects, a describe application command returns properties, generic or specific, defined on the application object. The application instance object will appear in a system catalogs database view and result in a new system catalogs application view.

In some examples, the application artifacts 436 are located in the same named storage location, such as the application artifacts named storage location 434, under the same root directory allowing the data platform 102 to take a snapshot of that directory when an application version of an application package 442 is being defined, thus ensuring immutability of the binaries the programs that the application instance 426 relies on for security reasons of consumers. In addition, a provider may be prevented from inadvertently modifying an existing application version of an application package 442 by changing or deleting files from a named storage location modified by the provider. For example, when an application version is added to the application package 442 a directory containing the files are copied to a named storage location in the application package 442. That named storage location is controlled by the data platform 102 and not the provider, accordingly, the provider cannot modify the files in that named storage location and does not have read access to the named storage location; however, the named storage location is visible from the application instance 426 for that application version in order for the programs defined there to be able to reference libraries and files stored in that named storage location.

A hidden application artifact role 450 is created when a new version is added. The data platform 102 grants permissions to the application artifact role 450 such as:

```
USAGE on SCHEMA "APP_ARTIFACTS_<VERSION>.<PATCH>";
READ on NAMED STORAGE LOCATION
"APP_ARTIFACTS_<VERSION>.<PATCH>".APP_FILES;
```

In some examples, during creation of the application package 442 by the provider, a hidden application artifact role 450 is created in the application package 442 database.

At runtime, the hidden application artifact role 450 is activated, thus making visible the named storage location corresponding to the application version of the application.

In some examples, a shared content role 452 is created by the data platform 102 when the application package 442 is created. The shared content role 452 is a nested role provisioned in the application package 442 and represents shared content that will be available to all application instances such as, but not limited to the one or more objects 440 of the shared content 438. All the objects in the application package 442 are owned by the provider primary role 446 of the provider 460 of the application package 442. Any role with the specified privileges will be able to modify the database objects defined in the application package 442. The shared content role 452 represents the shared content via a grant mechanism: any privileges on objects defined inside the application package 442 granted to the shared content role 452 are part of the shared content and will be available to the application instance 426.

In some examples, shared content role 452 is a hidden role that is owned by the data platform 102 and is not grantable by the provider 460 of the provider account 448. The provider 460 may grant and revoke privileges to and from shared content role 452 using a specific grant and revoke commands. For example:

```
GRANT <PRIVILEGE> on <OBJECT_TYPE> <OBJECT_NAME> to SHARE in
APPLICATION PACKAGE <PACKAGE_NAME>;
REVOKE <PRIVILEGE> on <OBJECT_TYPE> <OBJECT_NAME> from SHARE in
APPLICATION PACKAGE <PACKAGE_NAME>;
```

In some examples, a show grants command shows information schema and system catalogs views for grants and returns an identification of an application package as the grantee role type and an application package name as a grantee role name.

In some examples, objects that are part of the shared content are able to rely on objects defined inside or outside the application package 442, such as views or external tables. The objects added to the shared content may depend on Role-Based Access Control (RBAC) and owner's rights capabilities in order to be able to use the dependent objects outside of sharing flows.

In some examples, in a context of sharing via the application package 442, additional grants of the dependent object are made to the application package 442 to provide a methodology to ensure a provider is explicitly aware as to what is being shared, directly or indirectly, via the application package 442. In some examples, a provider grants a reference privilege on a dependent object to the application package 442 allowing the dependent object to be accessed indirectly via the application package 442, but that object is not visible to the application instance 426. Reference usage allows an object outside of the application package to be shared with the application instance. This privilege may ensure the provider is explicitly aware of what is being shared.

For example, commands to an application instance to add a dependent object to the shared content 438 of application package 442 include:

```
GRANT REFERENCE_USAGE on DATABASE
<PARENT_DATABASE_OF_DEPENDENT_OBJECT> to SHARE in APPLICATION PACKAGE
<PACKAGE_NAME>
```

As shown above, the reference grant will be on parent database object.

In some examples, when the application package 442 is created by the provider, one or more system roles are provisioned automatically. A hidden shared content role 452 is created that represents shared content such as, but not limited to, the objects of the shared content 438. Any objects granted to the shared content role 452 will be part of the shared content 438 and thus visible to the application instance 426. As the shared content role 452 is hidden from the consumer 458 and the provider 460, the shared content role 452 cannot be granted by the consumer 458 or the provider 460.

In some examples, a hidden application artifact role 450 is created when an application version is added and the application artifact role 450 is owned by the data platform 102. The application artifact role 450 is granted the privileges on the named storage location 434 of the application artifacts 436 specific to the application version of the application package 442 it was created for.

Database roles provisioned in the application instance from their definition in the setup script are automatically and programmatically granted to the owner of the application database, with a grant option. Consequently, any privileges on securables granted to those roles will result in the consumer being able to see those securables. The owner of the application instance will be able to grant those database roles to consumer roles. Example roles include, but not are limited to, an user role 406, and an administrator role 408 described in more detail with reference to FIG. 5.

The application primary role 404 owns any objects created by the setup script. The setup script runs as this role and, thus, everything created within the application instance by the setup script is owned by this role. An application primary role 404 is also granted the application importer role (described below). Accordingly, objects created by the setup script inside of the application instance are owned by, and run as, this role.

The application importer role 402 is a hidden role to which the consumer may grant access to objects within the consumer's environment that they want the application to access. Since this role is granted to the application primary role 404 all code inside of the application has the privileges that the consumer granted to the application importer role 402.

FIG. 5 is an illustration of an instantiation and usage method 500, in accordance with some examples. Although the example instantiation and usage method 500 depicts a particular sequence of operations, the sequence may be altered without departing from the scope of the present disclosure. For example, some of the operations depicted may be performed in parallel or in a different sequence that does not materially affect the function of the instantiation and usage method 500. In other examples, different components of a data platform 102 (of FIG. 1) or system that implements the instantiation and usage method 500 may perform functions at substantially the same time or in a specific sequence.

A compute service manager 104 (of FIG. 1) uses the instantiation and usage method 500 to instantiate an application instance, such as application instance 426 (of FIG. 4) in a consumer account of a consumer 458 (of FIG. 4), such as consumer account 454 (of FIG. 4).

In operation 502, the compute service manager 104 receives a create command from the consumer 458. For example, compute service manager 104 receives a create command from the consumer 458. An example create command is illustrated below:

```
CREATE APPLICATION <APPLICATION NAME>
FROM APPLICATION PACKAGE <APPLICATION PACKAGE NAME>;
```
10

In operation 504, in response to receiving the create command, the compute service manager 104 creates one or more system roles for use by the consumer 458 when using the procedures of the application instance 426. For example, the compute service manager 104 creates an application primary role 404 that owns all of the objects in the local state of the application instance 426. The compute service manager 104 also creates an application importer role 402 that is granted to the application primary role 404. The application importer role 402 is used by the consumer 458 to contain the permissions that the consumer 458 grants to objects it wishes the application instance 426 to access.

In operation 506, the compute service manager 104 creates the application instance 426 based on the application package 442. For example, the compute service manager 104 executes a setup script of the application package 442. In some examples, the setup script creates a set of stateful objects as unversioned objects 410 by defining them in an unversioned schema 414. In some examples, the setup script creates stateless objects 416 by defining them in a versioned schema 464. In some examples, the setup script creates database roles such as, but not limited to, a user role 406 and an administrator role 408.

In operation 508, the compute service manager 104 grants usage rights to one or more database roles, such as user role 406 and administrator role 408 of FIG. 4, to the owner of the application instance. In some examples, the setup script grants privileges on objects that it defines to these roles, conveying them to the consumer primary role 444.

In some examples, when the application instance 426 is being upgraded to a new version, the setup script modifies existing objects of the application instance 426.

In some examples, the application artifacts 436 stored as part of the version definition of the 442 such as, but not limited to java jars, python files, and the like, are not installed within the application instance 426. The application artifacts 436 are referred to from objects 416 that are installed by the installation script. For example, an object of objects 416 may be a java stored procedure that refers to a jar file that is located in the versioned artifacts schema 462, but these objects are directly accessed, at run time, in the provider package when the procedure is executed.

In some examples, when an application version of the application package 442 is created, the provider specifies a location of the root directory in a named storage location for that application version, and a manifest file is provided in that location. The data platform 102 configures one or more components of the application instance 426 based on the manifest file. The manifest file includes properties related to the application version of the application package 442 such as a name, an application version value, a display name and the like. The manifest file also includes information about runtime behavior of the application instance 426 such as, but not limited to, execution of extension code, connections to external services and the Uniform Resource Locations (URLs) of those services, running of background tasks and the like. The manifest file also includes information about objects or privileges used by the application instance 426 such as, but not limited to, database objects created in the consumer account 454, Application Programming Interface (API) integrations with sets of URLs, local storage require-ments, and the like. The manifest file also includes information about privileges to be granted to the application instance such as, but not limited to, execute a task on an account, and the like. The manifest file also includes information the script used to install or upgrade an application instance. In some examples, some of the properties defined in the manifest can be overridden on a command that adds an application version to the application package 442 as standalone properties.

In some examples, a setup script provisions the unver-sioned objects 410 and the versioned objects 424. The unversioned objects 410 includes an unversioned schema 414 and the provider is responsible for the creation, upgrade and deletion of those objects. The versioned objects 424 are defined in versioned schemas where a script of the applica-tion package 442 of the provider 460 creates those objects as part of an installation or upgrade process. The versioned objects 424 are only visible for a specific application version of the application package 442 and are deleted once the application package 442 has been upgraded to a newer application version. In some examples, the setup script is written in a proprietary language of the data platform 102 to ensure that no harmful code is executed as part of the setup script.

In some examples, one or more of the objects created by setup script rely on application files (libraries or files) that are specific to the application version of the application package 442. Example types include executable files such as, binaries, libraries, and code, that are provided as part of the application package 442 application version under the root directory of the named storage location for the appli-cation version. In some examples, shared content 438 is provided via a named storage location published by the provider as unversioned shared content.

In some examples, to create an application instance, the compute service manager 104 creates an application pack-age using an account privilege that will apply existing privileges to an object for the application package 442. For example, existing privileges may be granted for operations that may include any one or more of modify, monitor, usage, create schema, create role, and the like. In some examples, if the grant operation is using a database or application object type, then the system will resolve the securable name to an application package object and create a grant with the securable type set to application package. In some examples, if a revoke operation is performed with the database or application package object type on an application package, similarly to the grant operation, the data platform 102 will resolve the object and revoke the grant with application package as the securable type. In some examples, grant and revoke operations support application packages as the secur-able type for those privileges.

An example instantiated script is illustrated below:

```
// Create unversioned objects
CREATE DATABASE ROLE ADMIN;
CREATE DATABASE ROLE USER;
CREATE SCHEMA IF NOT EXISTS INTERNAL;
CREATE TABLE IF NOT EXISTS INTERNAL.STAT ...;
// Create versioned objects
CREATE VERSIONED SCHEMA PROGRAMS;
CREATE PROCEDURE PROGRAMS.LOOKUP( ) ...;
CREATE PROCEDURE PROGRAMS.UPDATE_STATS( ) ...;
CREATE VIEW PROGRAMS.<VIEW_NAME>
AS SELECT ... from DATA.<OBJECT_NAME>;
// Grant objects to the database roles
GRANT USAGE on SCHEMA PROGRAMS to DATABASE ROLE USER;
GRANT USAGE on PROCEDURE PROGRAMS.LOOKUP( ) to DATABASE ROLE USER;
```

In operation 510, at the command of the consumer 458, the compute service manager 104 executes the objects 416 of the versioned schema 464 or unversioned objects 410 based on the roles. For example, the compute service manager 104 permits a user or an administrator to execute one or more of the objects 416 based on the user role 406 and/or administrator role 408. The compute service manager 104 permits access to the object 440 of the shared content 438 of the application package 442 based on the shared content role 452.

In some examples, during execution of the objects 416, the processes that the objects 416 can perform on the consumer data that the objects 416 can access are controlled by the usages granted to application importer role 402. The usages are specified by the consumer. This protects the consumer 458 from unauthorized access to the proprietary objects of the consumer 458 by the provider 460.

In some examples, access by the objects 416 to the object 440 of the shared content 438 of the application package 442 is controlled by a shared content role 452. The usages granted to the shared content role 452 are specified by the provider 460. In this way, the shared content role 452 protects the objects 440 from unauthorized access by the consumer 458 outside of the execution context of the application instance 426.

In some examples, the database roles created by the application further protect the provider, in that consumers can only perform actions and see objects within the application that the application has explicitly granted to the consumer. In some examples, objects that are not granted to such database roles are not visible nor accessible to the consumer at all. In some examples, implementation of objects defined within the application are not visible to the consumer. That is, all commands and system views that would normally show a consumer the implementation, have this information redacted. In some examples, error messages produced from execution of application commands have details redacted that may leak implementation details, such as displaying of code fragments and stack traces.

In some examples, the objects 416 of the application instance 426 execute inside of an isolated execution environment or sandbox that is unique to the application instance 426. In some examples, the sandbox is shared by application instances that are instances of the same application package. In this way, access by the objects 416 to unauthorized operations, such as connecting to an external network, are prevented.

Figure 6:
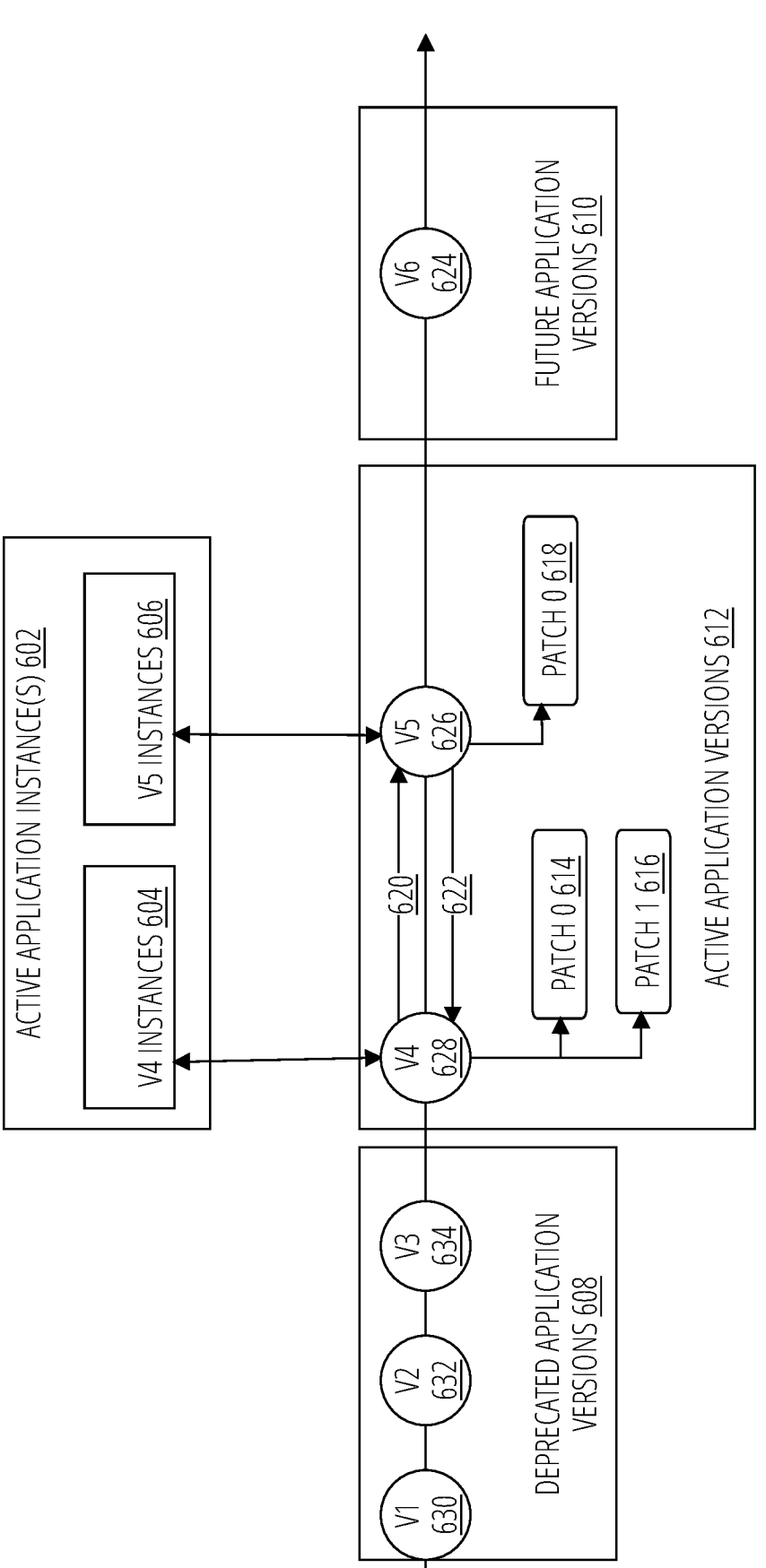
FIG. 6 is an illustration of an application package versioning methodology, in accordance with some examples.

FIG. 6 is an illustration of an application package versioning methodology using versioned schema, in accordance with some examples. An application can have one or more application versions, such as application version V1 630, application version V2 632, application version V3 634, application version V4 628, application version V5 626, and application version V6 624. A data platform 102 uses an upgrade process to either patch active application instances 602 of an application package or introduce a new application version, such as application version V6 624, to be used by consumers.

In some examples, an application version of an application is defined by various files that are located under a directory in a named storage location managed by a provider. The directory can include 1) manifest definition, 2) setup scripts, and 3) JAR libraries, Python files for UDFs, UDTFs, stored procedures and other objects that form the application logic. A provider adds an application version to the application package by passing the location of those application files to the application package.

In some examples, a specified number of active application versions 612 of an application package are active at the same time. Accordingly, there can be one or more deprecated application versions 608, one or more active application versions 612, and future application versions 610. In the illustrated example, application version V4 628 and application version V5 626 are active application versions having respective active application instances 602, such as V4 application instances 604 and V5 instances 606. Previously deployed application version V4 628 includes one or more patches, namely patch 0 614 and patch 1 616. Application version V5 626 is being rolled out and has a base patch level of patch 0 618. Application version V4 628 can be upgraded 620 to application version V5 626, and application version V5 626 can be rolled back 622 to application version V4 628 in processes described in more detail in reference to FIG. 7A, FIG. 7B, and FIG. 7C. In some examples, the specified number of active application versions 612 is two.

Once an application version is rolled out, it becomes part of the active application versions 612. To deploy an active application version to consumers, the provider sets up release directives. Once an active application version is not used anymore by any application, it can be removed by the application package provider.

Patches are used to roll out changes to the active application versions. Patches may include state changes and are compatible with both the currently installed application version and patch level as well as retain compatibility with the previous application version. A patch includes all the application files that an application version contains. In some examples, an application version can be bound to multiple patches at the same time. In some examples, a patch can only be added to an active application version. In some examples, patches are not considered as being active, thus all patches of an active application version are active implicitly.

In some examples, a new application version is added with a default patch zero.

In some examples, adding a new application version when there are already the specified number of active application versions (e.g., the current application version hasn't finished rolling out yet) will result in an error.

Below is an example command for adding an application version to the data platform 102:

```
ALTER APPLICATION PACKAGE <PACKAGE_NAME>
ADD Version [<VERSION_NAME>]
    USING <PATH_TO_VERSION_DIRECTORY>;
    [ LABEL = 'DISPLAY_LABEL_STRING' ]
```

Optional fields are picked from the manifest if not specified. If specified both in the manifest and the command, the command specification takes precedence.

As an application package can have multiple application versions (and patches), providers can view active application packages using a show application version command. In some examples, only an owner of an application package and those granted develop or manage released directive privileges on the application package can see the application versions of an application package.

Below is an example show application version command:

```
SHOW VERSIONS [LIKE <pattern>] IN APPLICATION PACKAGE<PACKAGE_NAME>;
```

The command returns the list of application versions/patches.

| Application version | Application version literal |
|---|---|
| PATCH | Patch Number |
| LABEL | Label provided by the user |
| COMMENT | The comment the user provides |
| CREATED_BY | Name of the role of the user that created the application version |
| CREATED_ON | Timestamp on which the application version was created |
| RELEASED_ON | Timestamp on which the first time a release directive was created for the application version/patch |
| DROPPED_ON | If the release is dropping, indicates the time at which the drop was issued |
| LOG_LEVEL | The log level as defined in the manifest for this application version |
| EVENT_LEVEL | The event level as defined in the manifest for this application version |
| DROPPING | Contains "Y" or "N" to indicate if the version is dropping |
| REVIEW_STATE | UNREVIEWED SUBMITTED REJECTED APPROVED |

In some examples, the data platform 102 automatically increments a patch number when a new patch is added to an application version. Explicit patches start at patch number 1. Patch numbers and comments are exposed to the providers via a describe application package command illustrated below:

```
ALTER APPLICATION PACKAGE <PACKAGE_NAME> ADD PATCH FOR Version
[<VERSION_NAME >]
USING <PATH_TO_VERSION_DIRECTORY>;
```

The command returns the system-generated patch number.

| | |
|---|---|
| PACKAGE_NAME | Name of the Application Package |
| Application version | Application version literal |
| PATCH_NUM | System-generated patch number |
| CREATED_BY | Name of the role of the user that granted the privilege |

In order to deprecate an application, an application version may be dropped by using an example command:

```
ALTER APPLICATION PACKAGE <PACKAGE_NAME>
DROP VERSION <VERSION_NAME>;
```

In some examples, a data platform 102 does not drop an application version if a release directive as described below still refers to that application version. The dropping of an application version is an asynchronous process and is not considered to be complete until specified conditions are met. In some examples, the specified conditions include, but are not limited to, instances of the application have successfully upgraded to another application version, no instances of the application are still actively running code from the applica-tion version being dropped, and the like. Until these conditions have been met, the application version is considered to be in a dropping state.

In some examples, when an application version or patch is made active by adding it via an alter application command, this is not sufficient to cause the application version to be installed within consumers accounts. An application version or patch will be actively rolled out to consumers when release directives are created targeting which accounts are to receive it. For example, a release directive may comprise two attributes: a default application version that applies to the entire universe of applications and any new applications created outside the override list specifying the consumer account or organization names. Thus overrides take precedence over the default application version setting. Both of these attributes can be set by the provider to one of the active application versions in the set of active application versions 612, such as current application version V5 626 or previous application version V4 628 with an optional patch number. If patch number is not specified, the latest patch is used. In some examples, the data platform 102 does not allow setting of an application version that has been depre-cated and is in the set of deprecated application versions 608 or in a set of future application versions 610.

The ability to manage the release directives for application packages and add application versions to the application package is granted through an object level privilege on the application package. An example command is illustrated below:

```
GRANT MANAGE RELEASE DIRECTIVES ON APPLICATION PACKAGE <PACKAGE_NAME>
TO ROLE <ROLE_NAME>;
```

In some examples, overrides allow an application version or patch to be targeted towards specific organizations or accounts as illustrated in the command below:

```
ALTER APPLICATION PACKAGE <PACKAGE_NAME>
   SET RELEASE DIRECTIVE <DIRECTIVE_NAME>
      ACCOUNTS = (<CONSUMER_ORG_NAME>.< CONSUMER_ACCT_NAME> [,
...])
      VERSION = <VERSION_LITERAL>
      PATCH = <PATCH_NUM>;
ALTER APPLICATION PACKAGE <PACKAGE_NAME>
   SET RELEASE DIRECTIVE <DIRECTIVE_NAME>
   ORGANIZATIONS = (<CONSUMER_ORG_NAME>, [, ...]) Application
version = <VERSION_LITERAL>
PATCH = <PATCH_NUM>;
``` where:

DIRECTIVE_NAME is a logical, unique, name for the directive. This name will be used to identify and manage the directive in other commands.

CONSUMER_ORG_NAME is the name of the organization in which the application version/patch is to be installed.

CONSUMER_ACCOUNT_NAME is the name of a specific account in which the application version/patch is to be installed. This will take precedence over any directive created against the organization in which the account exists.

VERSION is the name of the literal name of the application version to install.

PATCH_NUM is the patch number within the application version to install.

In some examples, overrides are defined before defining a default application version to avoid consumers accidentally receiving the default version. In some examples, overrides are matched in the following order, with the first match in the list taking precedence: accounts, organizations, and a default value.

In some examples, a given release directive may be retargeted to a different application version as illustrated by the example command below:

```
ALTER APPLICATION PACKAGE <PACKAGE_NAME>
   MODIFY RELEASE DIRECTIVE <DIRECTIVE_NAME>
   VERSION = <VERSION_LITERAL>
   PATCH = <PATCH_NUM>;
```

In some examples, directives may be removed, such as by an example command:

```
ALTER APPLICATION PACKAGE <PACKAGE_NAME>
   UNSET RELEASE DIRECTIVE <DIRECTIVE_NAME>;
```

Removing an override will cause any targeted organization or account to be updated to the default application version. In some examples, default application version directives cannot be removed but only updated.

In some examples, any consumer account that does not have an override will receive a default application version. All new application instances use the default application version. The following example command illustrates alter a default application version:

```
ALTER APPLICATION PACKAGE <PACKAGE_NAME> SET DEFAULT RELEASE
DIRECTIVE
VERSION = <VERSION_LITERAL> PATCH= <PATCH_NUM>;
```

A show released directives command displays established directives as illustrated by the following command:

```
SHOW RELEASE DIRECTIVES [ LIKE '<PATTERN>' ]
IN APPLICATION PACKAGE <PACKAGE_NAME>;
``` which returns the following columns:

| | |
|---|---|
| NAME | The name of the directive. This will be DEFAULT for the default directive. |
| TARGET_TYPE | The type of target for the directive, being either NULL (for the default directive), ORG, or ACCOUNT. |
| TARGET_NAME | NULL (for the default directive) or the name of the organization or account. |
| CREATED_ON | The timestamp at which the directive was created. |
| CREATED_BY | Which role created the directive. |
| Application version | Name of the application version literal if applicable, NULL otherwise. |
| PATCH_NUM | Patch number of the application version if applicable, NULL otherwise. |
| MODIFIED_ON | The timestamp at which the directive was last modified, or NULL if it hasn't been modified. |
| MODIFIED_BY | Which role modified the directive, or NULL. |

In some examples, a provider may push out a release in which a significant issue is discovered soon after the rollout begins (either while the release is still rolling out, or soon after it has completed). A general effect of a rollback can be achieved by modifying the directives to refer to the previous application version as stored in a set of previous application package versions. This will switch the consumers versioned code back to the application version they were running prior to the rollout of the broken application version. This is safe due to the requirement that the local state (non-versioned logic) be compatible between the old and new application version. In some examples, this may not address the issue if the problem was due to upgrading the local state itself as the upgrade may have accidentally performed changes that are incompatible with the previous application version. If the local state is the source of the problem, then a new application version can be created (either based upon the previous "good" application version or by fixing the new application version), and rolled out.

Figure 7A:
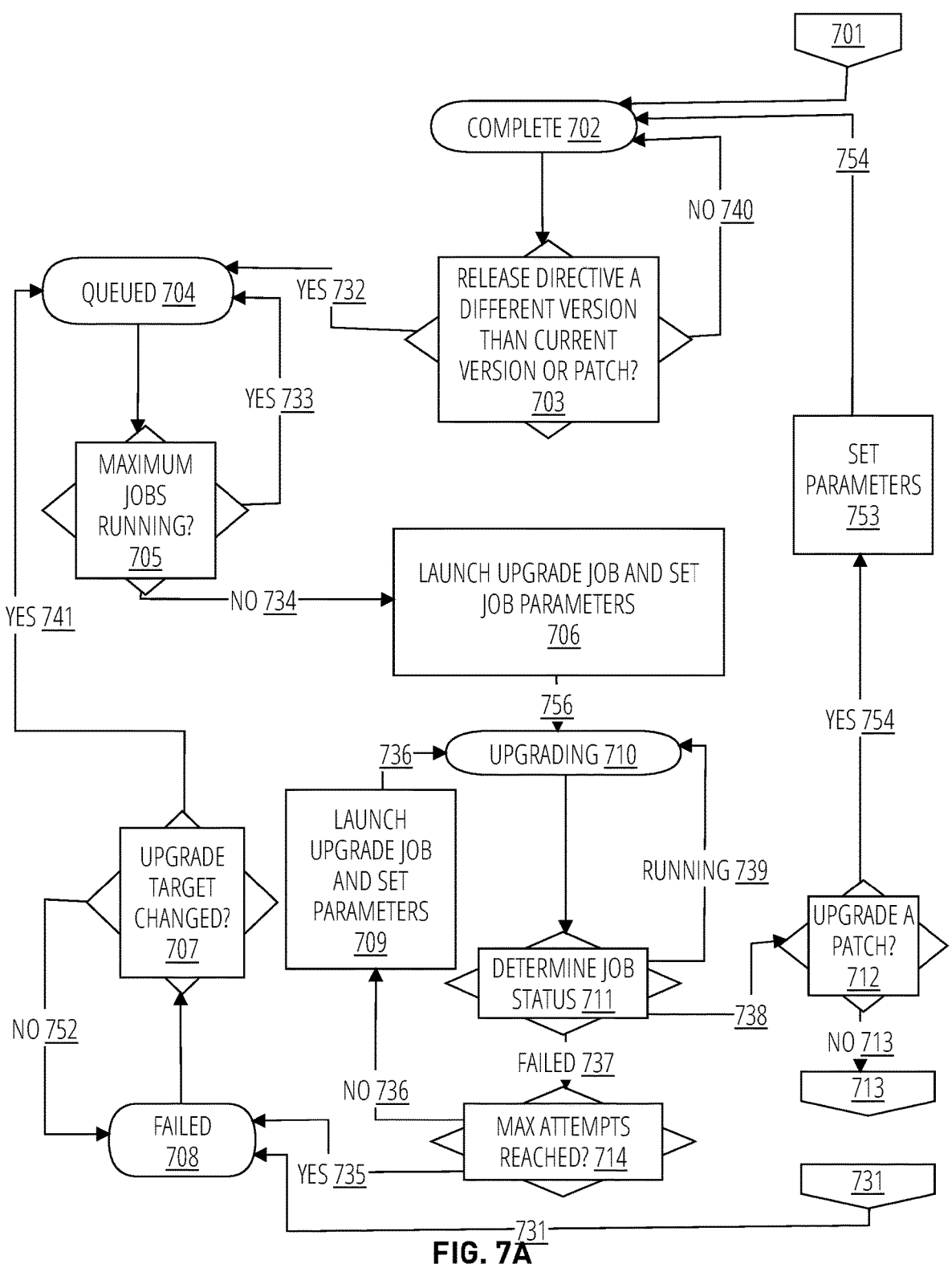
Figure 7C:
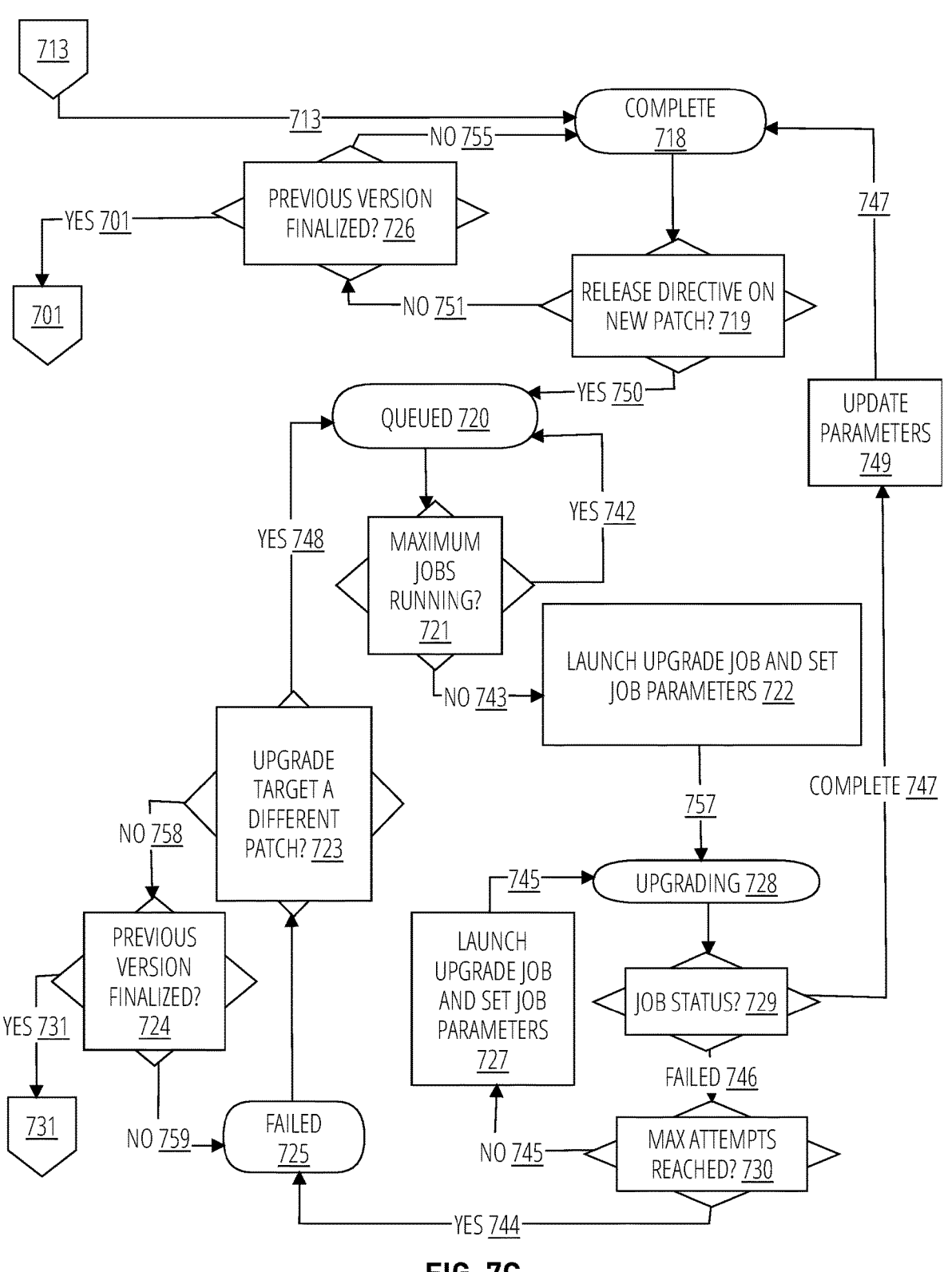

FIG. 7A, FIG. 7B, and FIG. 7C illustrate a state flow diagram of a versioned application package and schema installation and upgrade process, in accordance with some examples. A compute service manager 104 of FIG. 1 executes a versioned application package and schema installation and upgrade process in order to install or upgrade a versioned application package, such as application package 442 of FIG. 4 into a consumer account 454 as an application instance, such as application instance 426 of FIG. 4.

Pull upgrade—This happens in developer mode when an ALTER APPLICATION UPGRADE command is executed and is a synchronous operation (with respect to the user's session).

Push upgrade—Managed by a background job that determines that an instance needs to be updated. This happens asynchronously.

In some examples, an upgrade process is encapsulated into a single interface so that it may be executed from within either of these contexts.

The data platform 102 maintains information about the state of an instance with respect to upgrade in an upgrade state field. The state of an application instance is comprised of a current version that is a set of fields that track the currently installed version of the application and an upgrade state that is a set of fields that track if the instance is in need of upgrade, in the process of upgrading, or has failed an upgrade. A field for tracking this information is an upgrade state field, having one of the following values:

| State | Description |
|---|---|
| COMPLETE 702 | The instance is either freshly installed or has successfully completed an upgrade and all executing code is for the current version only. |
| QUEUED 704 | The instance needs to be upgraded but resources are not yet available to begin the upgrade process. |
| UPGRADING 710 | The instance is in the process of upgrading the application state, but the code version is still that of the version prior to the upgrade. |
| FAILED 708 | The instance has failed an upgrade. The code for the version that was being upgraded is still current (i.e., the code for the upgrade is not active), but the application state may be partially upgraded |

Additional fields track a previously installed version. The main purpose of tracking the previously installed version is to determine if code may still be executing from that version (and any of its patches). The primary field tracking this is a previous version state field that may have a COMPLETE value meaning that there is either no previous version, or the previously installed version no longer has any executing code, and a FINALIZING state indicating that the previously installed version still has executing code. Additionally, a previous version time field keeps track of when the previous version entered the FINALIZING state. These states work together to determine when a new version may be installed. In some examples, a patch on the currently installed version may always be installed, providing another patch is not already in the process of being upgraded. In some examples, a new major version may only be installed if the previous version state is COMPLETE—that is, there is no longer code executing on that version and another upgrade is not currently taking place. In some examples, instances in the QUEUED state may be updated to a new target if the release directive changes while in that state, or may even be dequeued if they are retargeted onto their current version.

FIG. 7A illustrates a state diagram of an upgrade and finalizing process for a current version when the previous version is COMPLETE (has no more code executing), FIG. 7C illustrates a state diagram for a behavior when the previous version is FINALIZING (has code running), and FIG. 7B illustrates operations performed when transitioning between the states of COMPLETE and FINALIZING, in accordance with some examples. A compute service manager 104 performs upgrade and finalizing processes in accordance with the state diagrams.

As illustrated, both state diagrams start in a COMPLETE state, such as complete state 702 and complete state 718, however, to leave a COMPLETE state and enter a QUEUED state (such as queued state 720 and queued state 704), the rules are different depending on the state of the previous version. If a previous version is COMPLETE, any upgrade may be QUEUED. If the previous version is FINALIZING, the upgrade may only move forward if it is a patch on the current version. In both flows through the state diagrams, the handling of QUEUED upgrades is the same. An upgrade is queued by writing to an upgrade processing datastore. An instance upgrade background task scans the queue to process upgrades. A number of actively running jobs is tracked via a native application's maximum upgrades variable and application instances remain in the QUEUED state until a slot is available. If a slot is available, an application instance enters an UPGRADING state, and an upgrade job is launched. Similarly, UPGRADING in both the FINALIZING state and the COMPLETE state is the same. While in an upgrading state, when a job completes, job callback hooks will directly update the state instance. If the instance state has not been updated in a native applications upgrade poll, the application instance will be polled by the background job in the event there was a hard failure. Failed upgrades are retried up to a native applications upgrade maximum attempts value, after which they enter the FAILED state. If an upgrade successfully completes, the following takes place: if the upgrade was a patch, return to the COMPLETE state in whichever previous version state the system is in (either COMPLETE or FINALIZING) and if the upgrade is to a new version, then the previous version state becomes FINALIZING. A FAILED state is a form of COMPLETE and the rules to go from FAILED to QUEUED are the same except that the release directives target a version and patch that is different from the target of the FAILED upgrade in order to move forward.

In some examples, a currently installed version of an application package or patch, N, starts out in a complete state 702. For example, for an original install, then N is 0, meaning that no version of the application package has been instantiated in a consumer's account. In a case that N is 0 for a patch, it will mean that the version has not been patched. For an upgrade, N will be greater than 0.

While in the complete state 702, in operation 703, the compute service manager 104 determines if a release directive is a different version than the currently installed version, N. For example, the directive indicates a version that is greater than the currently installed version, then an upgrade will be performed from N to N+1 versions. If the directive indicates a version that is lower than the currently installed version, then a roll back will be performed from N to N−1 versions.

If the compute service manager 104 determines that the directive does not indicate a new version, then the compute service manager 104 transitions 740 back to the complete state 702. If the compute service manager 104 determines that the directive is directed to a new version, the compute service manager 104 transitions 732 to a queued state 704.

While in the queued state 704, in operation 705, the compute service manager 104 determines if a value of a maximum number of jobs is running on the data platform 102 has been achieved. In response to determining that the number of maximum jobs has been reached, the compute service manager 104 transitions 733 back to the queued state 704. In response to determining that the value of a maximum number of jobs has not been achieved, the compute service manager 104 transitions 734 to operation 706.

In operation 706, the compute service manager 104 launches a job in order to perform the upgrade and updates a set of job parameters. For example, the compute service manager 104 launches the upgrade job and increments an attempt counter, and determines a job Universal Unique IDentifier (UUID) so that the job may be identified throughout the data platform 102. The compute service manager 104 then transitions 756 to the upgrading state 710.

While in the upgrading state 710, the compute service manager 104 determines a job status of the upgrade job. In operation 711, the compute service manager 104 determines a job status for the upgrade job. In response to determining that the upgrade job is still running, the compute service manager 104 transitions 739 back to the upgrading state 710.

In response to determining that the upgrade job is complete, the compute service manager 104 transitions 738 to operation 712.

In operation 712, the compute service manager 104 determines if the upgrade that just completed was a patch. In response to determining that the upgrade that just completed was a patch, the compute service manager 104 transitions 754 to the complete state 702. In addition, in operation 753, the compute service manager 104 updates a set of job parameters. For example, the compute service manager 104 sets the upgrade job UUID to null, and sets the currently installed version and/or patch level.

In response to determining that the upgrade that just completed was not a patch, the compute service manager 104 transitions 713 to complete state 718 of FIG. 7C in order to determine finalization of the upgrade. In addition, the compute service manager 104 updates a set of upgrade parameters in operation 716. In operation 716, the compute service manager 104 adds the just installed version value to a set of currently installed version variables. For example, the compute service manager 104 adds the just installed version to the set of versions that are running and sets up for the removal of the just replaced version. For example, the compute service manager 104 sets the upgrade job UUID to null, sets a current version to the version and patch that was just installed, sets a previous version, sets a previous patch level, sets a previous version state, adds the recently upgraded to an active version variable, sets an upgrade target version to null, and sets an upgrade target patch variable to null.

In response to determining that the upgrade job has failed, the compute service manager 104 transitions 737 to operation 714.

In operation 714, the compute service manager 104 determines if a maximum number of attempts at running the upgrade job has been achieved. In response to determining that a threshold number of attempts at running the upgrade job has not been achieved, the compute service manager 104 transitions 736 to operation 709 and launches an upgrade job as previously described.

In response to determining that the threshold number of attempts at running the upgrade job has been achieved, the compute service manager 104 transitions 735 to failed state 708.

In failed state 708, the compute service manager 104, in operation 707, determines if an upgrade target has changed. In response to determining that the upgrade target has not changed, the compute service manager 104 transitions 752 back to failed state 708. In response to determining that the upgrade target has changed, the compute service manager 104 transitions 741 to queued state 704 and continues operations from that state as described herein.

Referring to FIG. 7C, while in the complete state 718, in operation 719, the compute service manager 104 determines if a release directive is directed to a new patch. In response to determining that a release directive is directed to a new patch, the compute service manager 104 transitions 750 to queued state 720. If the compute service manager 104 determines that a directive is not directed to a new patch, the compute service manager 104 transitions 751 to operation 726.

In operation 726, the compute service manager 104 determines if a previous version of the application package being upgraded or patched has been finalized, meaning that no instances of application objects are running at the previous version level. For example, the compute service manager 104 determines when code executing on the data platform 102 is no longer accessing specific versions of an application. To do so, the compute service manager 104 determines which jobs are running against specific versions of the application.

In some examples, a native application job flag is used. The native application job flag is applied to all stored procedures and table functions launched within jobs comprising instances of the application objects launched within a native application context. An instance maintenance background task will visit all application instances, in account order, looking for those application instances in a FINALIZING state. While within the same account, the instance maintenance background task will skip over any application instance that has been in the FINALIZING state less than a specified grace period. The instance maintenance background task scans for an end time threshold for the account and looks for jobs comprising instances of the application objects with the native application job flag set. If a job comprising instances of the application objects is found with a creation date less than a current version timestamp plus a native application delay offset (and is thus within a grace period for finalization), the scan is stopped and the application instance is left in the FINALIZING state. For subsequent application instances within the same account, the compute service manager 104 compares the previously found creation time to the current version timestamp, or continues to scan where the compute service manager 104 left off previously looking for an older time.

In some examples, the native application delay offset is a safety net to allow for the fact that a query against a given application version could have been compiled/compiling at the time an upgrade enters a FINALIZING state, but may not have been started, yet when it starts it will be running against the older version. In some examples, the compute service manager 104 detects this situation by polling a global service of the data platform 102 for compiling queries related to application instances.

In some examples, if a job comprising instances of the application objects is found where the job has exceeded the grace period for finalizing, the job is terminated.

In some examples, the compute service manager 104 determines a number of objects of an application instance running on the data platform 102 at a previous version level of the application package of an application instance. In response to determining the number of objects of the application instance running on the data platform at the previous version level of the application instance is one or more, the compute service manager 104 continues to determine the number of objects running on the data platform 102 at a previous version level of the application package of the application instance. In response to determining the number of objects of the application instance running on the data platform at the previous version level of the application package is none, the compute service manager 104 upgrades the application instance to the new version of the application package.

In response to determining that a previous version has been finalized, the compute service manager 104 transitions 701 to complete state 702 of FIG. 7A. In doing so, the compute service manager 104 sets a set of finalization parameters in operation 715. For example, the compute service manager 104 removes the previous version from a set of active versions for the application and adds the previous version to a set of prior versions.

In operation 726, in response to determining that the previous version has not been finalized, the compute service manager 104 transitions 755 to complete state 718.

In operation 719, in response to determining that the release directive is directed to a new patch, the compute service manager 104 transitions 750 to queued state 720.

While in the queued state 720, in operation 721, the compute service manager 104 determines if a value of a maximum number of jobs is running on the data platform 102 has been achieved. In response to determining that a number of running jobs has reached a maximum value, the compute service manager 104 transitions remain 742 back to queued state 720. In response to determining that the value of a maximum number of jobs has not been achieved, the compute service manager 104 transitions 743 to operation 722.

In operation 722, the compute service manager 104 launches a job in order to perform the upgrade and updates a set of job parameters. For example, the compute service manager 104 launches the upgrade job and increments an upgrade attempt counter, and determines a job Universal Unique IDentifier (UUID) so that the job may be identified throughout the data platform 102. The compute service manager 104 then transitions 757 to an upgrading state 728.

While in the upgrading state 728, the compute service manager 104, in operation 729, determines a job status for the upgrade job. In response to determining that the upgrade job is still running, the compute service manager 104 transitions back to the upgrading state 710. In response to determining that the upgrade job is complete, the compute service manager 104 transitions 747 to complete state 718. In addition, the compute service manager 104 updates a set of upgrade parameters in operation 749. For example, the compute service manager 104 adds the just installed version value to a set of currently installed version variables. For example, the compute service manager 104 adds the just installed version to the set of versions that are running and sets up for the removal of the just replaced version. For example, the compute service manager 104 sets the upgrade job UUID to null, sets a current patch variable to N+1, sets an upgrade target version to null, and sets an upgrade target patch variable to null.

In response to determining that the upgrade job has failed, the compute service manager 104 transitions 746 to operation 730.

In operation 730, the compute service manager 104 determines if a maximum number of attempts at running the upgrade job has been achieved. In response to determining that a threshold number of attempts at running the upgrade job has not been achieved, the compute service manager 104 transitions 745 to operation 727 and launches an upgrade job as previously described. In response to determining that the threshold number of attempts at running the upgrade job has been achieved, the compute service manager 104 transitions 744 to failed state 725.

In failed state 725, the compute service manager 104, in operation 723, determines if an upgrade target has changed to a different patch level. In response to determining that the upgrade target is a different patch, the compute service manager 104 transitions 748 to queued state 720 and continues operations as previously described. In response to determining that the upgrade target has not changed to a different patch level, the compute service manager 104 transitions 758 to operation 724 and determines if the previous version has finalized as described in reference to operation 726. If the previous operation has not been finalized, the compute service manager 104 transitions 759 back to failed state 725.

In operation 724, in response to determining that the previous version of the application package has been finalized, the compute service manager 104 transitions 731 to failed state 708 of FIG. 7A. In doing so, the compute service manager 104, in operation 717, updates a set of finalization parameters. For example, the compute service manager 104 removes the previous version from a set of active versions and adds the previous version to a set of prior versions.

Figure 8:
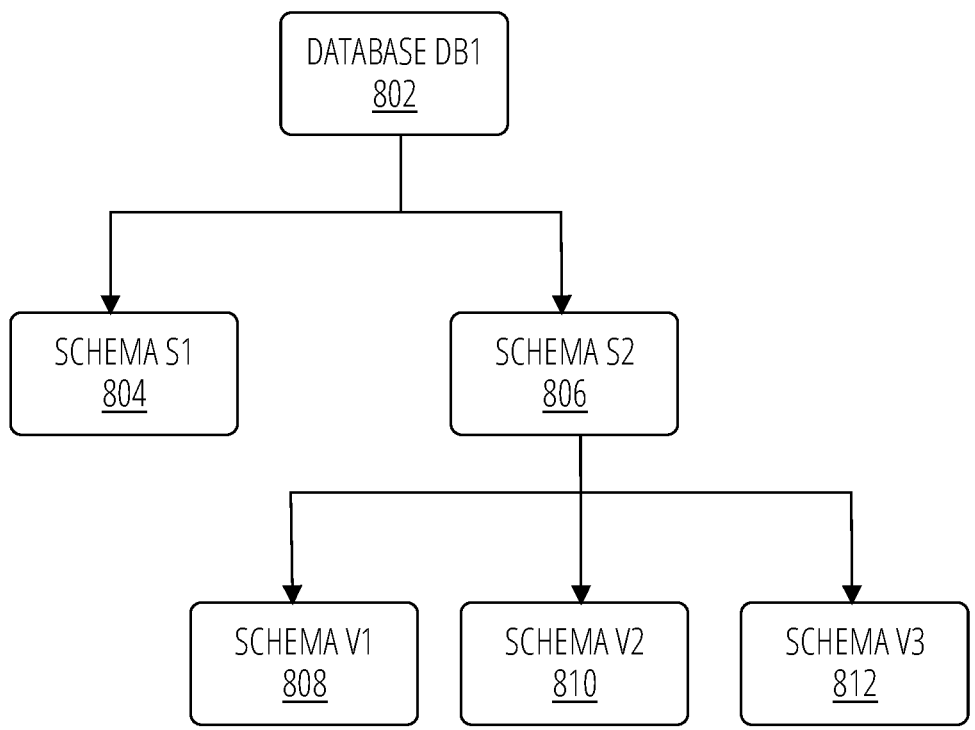
FIG. 8 is an illustration of a schema version relationship, in accordance with some examples.

FIG. 8 is an illustration of a schema version relationship, in accordance with some examples. Versioned schemas provide a capability of allowing a provider to deploy version upgrades and patches for an application object of a data platform 102. For example, a database DB1 802 includes one or more schemas, such as schema S1 804 and schema S2 806. Schema S2 806 is versioned and includes one or more versions, such as schema V1 808, schema V2 810, and schema V3 812. Schema S2 806 comprises metadata, such as grants, tags, settings and the like used for accessing and operating on the objects within the schema S2 806. The versioned schemas, such as schema V1 808, comprise the actual objects, such as tables, views, procedures, functions, named storage locations, and the like, of the schema. In contrast, an unversioned schema, such as schema S1 804 comprises the metadata and the actual objects. As an additional example, versioned artifacts schema 462 of application package 442 and application instance 426 (of FIG. 4) comprises the application artifacts 436 of the application package 442 and the versioned objects 424 of the application instance 426.

While the contents of versioned schema S2 806 are versioned, the schema S2 806 itself is considered unversioned. Properties set on the schema S2 806 affect all versions of the schema S2 806 as well as for grants of privileges.

In some examples, a version context is determined by the following rules: 1) if the version context is in a call context, use the version of the call context; 2) if there is a global version set on the parent database DB1 802, use that version (and set it into the call context); 3) finally, if there was nothing in the call context and no global version set on the creating those objects as part of the installation or upgrade process (if introduced during an upgrade).

In some examples, since the versioned schema is used for a single version of the application, it will not be accessible and visible after the application has been fully upgraded, except for processes that were initiated before the upgrade of the application. Such processes will be bound to the old version until they complete. In some examples, the data platform 102 places a time limit of how long a process can execute. In some examples, the time limit is one week.

The data platform 102 drops the schema after the version (to which the schema is bound) is removed from the application package.

In some examples, a version is removed from the application package if all instances are on the new version, and if there is no workload using the old version.

In some examples, cleaning the old schema is performed after the version is removed since a downgrade or roll back to the old version is possible.

In some examples, a versioned schema is a versioned container, but the version information is not specified when that container is created. Instead, this container derives the version it is bound to at creation time. For example, a version is determined based on an application database container the schema is defined in, or a versioning context in place, such as context defined when a setup instance script is executed during installation or upgrade time.

In a runtime example, after the version has been determined, the version in use will be set in the execution context that will be used for the job being executed, as well as child jobs, effectively pinning child processes to the same version in case an upgrade takes place during the execution of the overall job.

In some examples, versioned schemas of the same name can exist in the same application database for different versions.

An example script to create a schema is illustrated below:

```
CREATE [ OR REPLACE ] [VERSIONED] [ TRANSIENT ] SCHEMA [ IF NOT
EXISTS ] <name>
    [ CLONE <source_schema>
        [ { AT | BEFORE } ( { TIMESTAMP => <timestamp> | OFFSET =>
<time_difference> | STATEMENT => <id> } ) ] ]
    [ WITH MANAGED ACCESS ]
    [ WITH VERSION[ <version_name> ] ]
    [ DATA_RETENTION_TIME_IN_DAYS = <integer> ]
    [ MAX_DATA_EXTENSION_TIME_IN_DAYS = <integer> ]
    [ DEFAULT_DDL_COLLATION = '<collation_specification>' ]
    [ [ WITH ] TAG ( <tag_name> = '<tag_value>' [, <tag_name> = '<tag_value>' , ... ] ) ]
    [ COMMENT= '<string_literal>' ]
``` database DB1 802, an 'active version' is pulled from the schema S2 806 itself (and then set into the call context).

Figure 9:
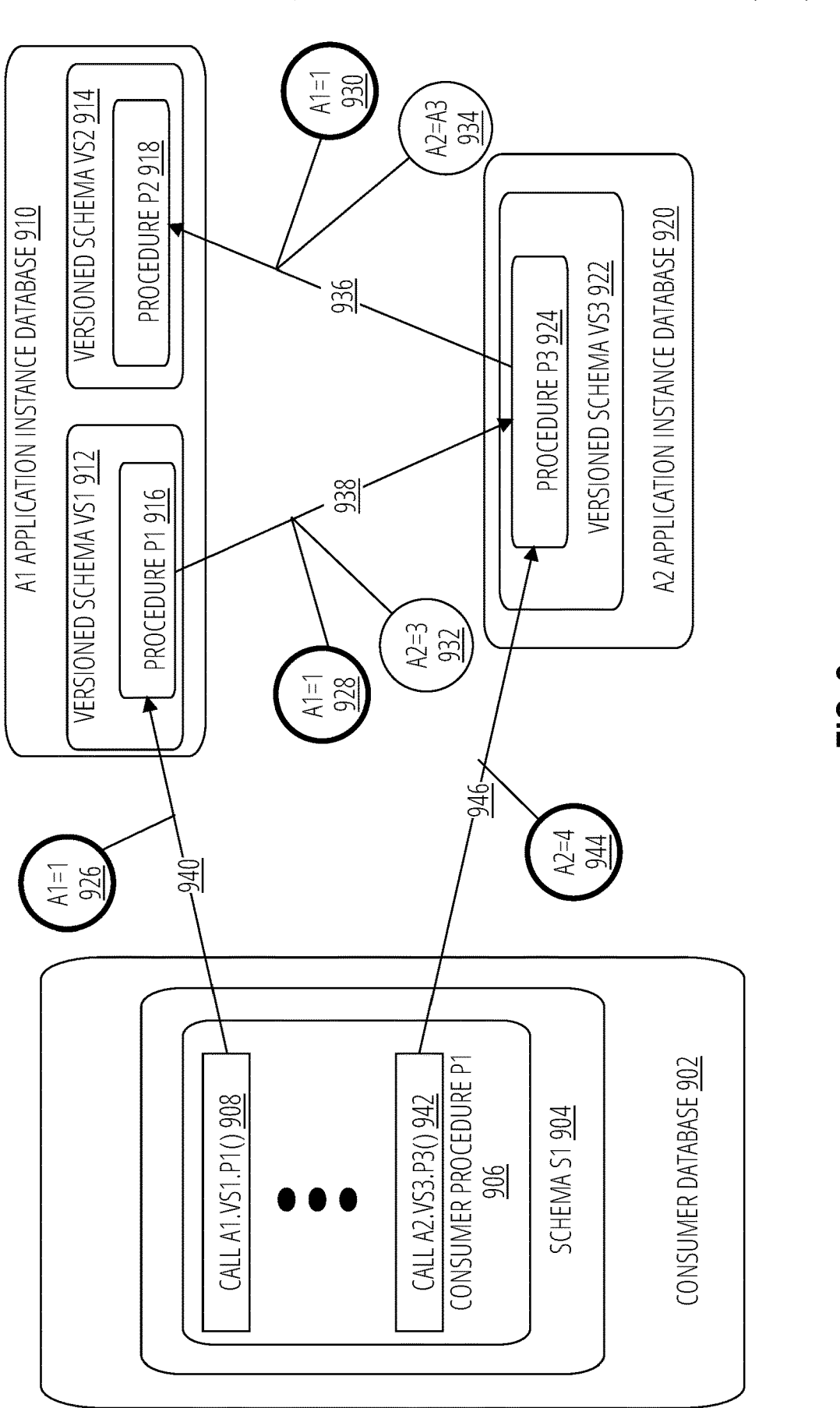
FIG. 9 is an illustration of an example pinning or association process, in accordance with some examples.
Figure 10A:
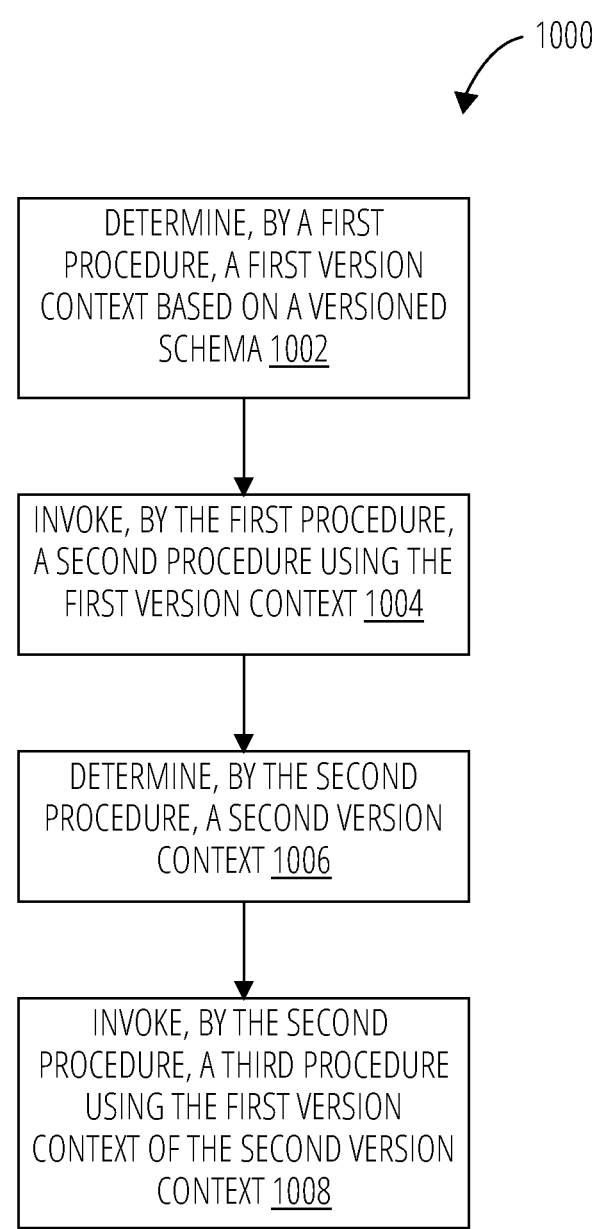
FIG. 10A is a process flow diagram of a pinning or association process, in accordance with some examples.
Figure 10B:
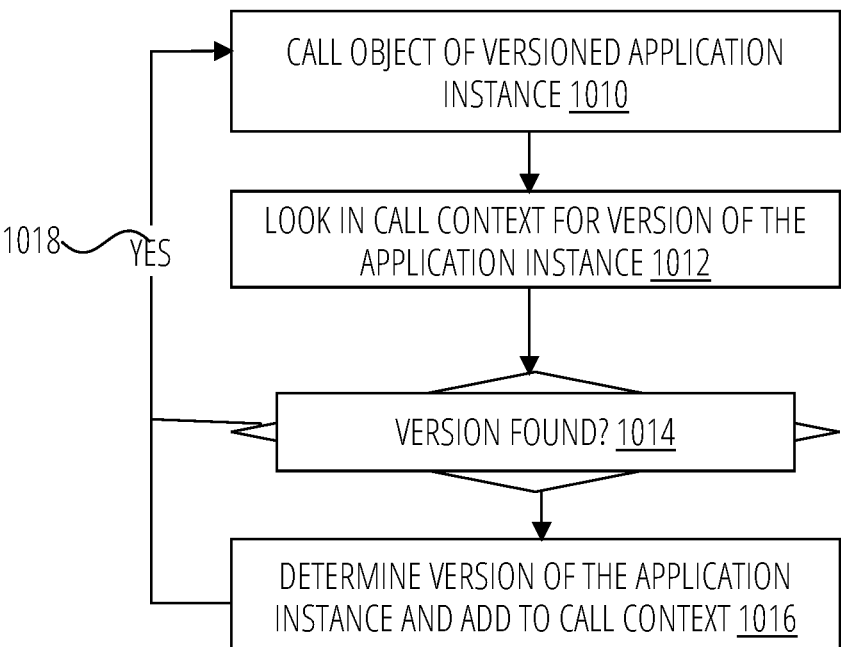
FIG. 10B is a process flow diagram of another pinning or association process, in accordance with some examples.

In some examples, a versioned schema is created under an application database, and that is tied to a specific version of the application, and once the application is migrated to a different version, the data platform 102 will delete that schema automatically. Consequently, a provider can choose to define objects as unversioned (as in a normal schema) and the provider is responsible to create those objects as part of the installation or upgrade process (if introduced during an upgrade) and update those objects during the upgrade process (if changes are required) and drop those objects during the upgrade process (if not used anymore). A provider may also choose to define objects as versioned (defined in versioned schemas) and the provider is responsible for Association of Application Instances with Versioned Schema FIG. 9 is an illustration of a version pinning or association process, and FIG. 10A and FIG. 10B are process flow diagrams of the pinning or association process, in accordance with some examples. When a data platform 102 processes a request into an application instance that accesses an object in a versioned schema, the data platform 102 resolves which version of the schema to use. During an upgrade from one application version to another application version, it is possible that there is more than one version of the application is in use at the same time. In some examples, with patches, any number of versions may be in use at the same time.

"Version resolution" refers to the process of determining an appropriate version of code that should be executed when a call is made into the native application.

"Version pinning" is a process by which the data platform 102 ensures that once versioned code is executed that the entire call hierarchy (e.g., procedures calling procedures) stay pinned to the same version, even if an upgrade takes place in the middle of execution.

Version resolution takes place when an object in a versioned schema within an application instance is first accessed. In some examples, a current version is maintained in an application-current-version field and an application-current-patch field of an application instance database.

For each application instance database in which a versioned schema is accessed, the data platform 102 caches the selected version/patch for that database in the call context for the statement to be executed. In the case of stored procedure executions, all versioned cached within the call context will be further propagated into the procedure and, thus, down through anything that procedure executes using a stored procedure child job initializer. Accordingly, an entire chain of calls will stay "pinned" or associated to the selected version.

that A1 application instance database 910 is at version 1 (A1=1), and passes back version context 934 indicating that A2 application instance database 920 is at version 3 (A2=3). This ensures that even if A1 application instance database 910 were upgraded during this call chain, version 1 will continue to be used and if A1 application instance database 910 were to call back into A2 application instance database 920, that too would stay pinned or associated to the same version.

In some examples, an application, such as A2 application instance database 920, may be upgraded to a new version having a versioned schema at version level 4. If the upgrade happens while consumer procedure P1 906 is still running, a next invocation 946 by consumer procedure consumer procedure P1 906 to procedure P3 924 will result in call A2.VS3.P3( ) 942. Call A2.VS3.P3( ) 942 includes version context 944 showing that A2 application instance database 920 is now at level 4 (A2=4). Accordingly, procedure P3 924 at version level 4 will be invoked instead of procedure P3 924 at version level 3.

Example scripts used to pin a versioned schema to a database are illustrated below:

```
CREATE [OR REPLACE] [TRANSIENT] DATABASE [IF NOT EXISTS] <>NAME
[ CLONE <source_db>
  [ { AT | BEFORE } ( { TIMESTAMP => <timestamp> | OFFSET =>
<time_difference> | STATEMENT => <id> } ) ] ]
[ DATA_RETENTION_TIME_IN_DAYS = <integer> ]
[ DEFAULT_VERSION = <version_name> ]
[ MAX_DATA_EXTENSION_TIME_IN_DAYS = <integer> ]
[ DEFAULT_DDL_COLLATION = '<collation_specification>' ]
[ [ WITH ] TAG ( <tag_name> = '<tag_value>' [ , <tag_name> = '<tag_value>' , ... ] ) ]
[ COMMENT= '<string_literal>' ]
ALTER DATABASE[ IF EXISTS ] <name> SET
  [ DATA_RETENTION_TIME_IN_DAYS = <integer> ]
  [ DEFAULT_VERSION = <version_name> ]
  [ MAX_DATA_EXTENSION_TIME_IN_DAYS = <integer> ]
  [ DEFAULT_DDL_COLLATION = '<collation_specification>' ] [ COMMENT =
'<string_literal>' ]
ALTER DATABASE [ IF EXISTS ] <name> UNSET {
DATA_RETENTION_TIME_IN_DAYS      | DEFAULT_VERSION
|MAX_DATA_EXTENSION_TIME_IN_DAYS | DEFAULT_DDL_COLLATION      |
COMMENT
} [ , ... ]
```

For example, a consumer invokes their own consumer procedure consumer procedure P1 906 that is an object of a consumer database 902 having a versionable schema S1 904. The consumer procedure P1 906 invokes 940 a procedure of versioned schema VS1 912, namely procedure P1 916 as indicated by call A1.VS1.P1( ) 908, this resolves the current version of A1 as version 1 as indicated by version context 926 and invokes procedure P1 916 at that version.

Procedure P1 916 then invokes 938 a procedure in another application instance database, namely procedure P3 924, as indicated by call A2.VS3.P3( ) 942. This invocation results in a call that then invokes 938 a procedure in another application instance database, namely procedure P3 924 of versioned schema VS3 922 of A2 application instance database 920 using version context 928 and version context 932. This invocation propagates the version context that A1 application instance database 910 is at version 1 (A1=1), and that A2 application instance database 920 is at version 3 (A2=3).

In a call back process, procedure P3 924 invokes 936 a procedure in A1 application instance database 910, namely procedure P2 918 of versioned schema VS2 914. During this call, procedure P3 924 passes version context 930 indicating FIG. 10A is a process flow diagram of a pinning or association process, in accordance with some examples. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

An association method 1000 is used by a procedure of a container of an application package to pin or associate one or more executing procedures to a version of a versioned schema.

In operation 1002, a first procedure determines a first version context of a second procedure based on a versioned schema. For example, the first version context is determined by the following rules: 1) if in call context, use the version of a call context of the first procedure and the second procedure; 2) if there is a global version set on a parent database of the first procedure and the second procedure, use the global version (and set it into the call context); 3) if there was nothing in the call context and no global version set on the database, an 'active version' is pulled from the versioned schema itself (and then set into the call context).

In operation 1004, the first procedure invokes the second procedure using the first version context of the second procedure. For example, the first procedure calls the second procedure and places the second procedure and the first version context into the call context. The first procedure provides the first version context to the second procedure when the first procedure invokes the second procedure.

In operation 1006, the second procedure determines a second version context of the third procedure. For example, the version context is determined by the following rules: 1) if in call context, use the version of a call context of the first procedure and the second procedure; 2) if there is a global version set on a parent database of the first procedure and the second procedure, use the global version (and set it into the call context); 3) if there was nothing in the call context and no global version set on the database, an 'active version' is pulled from the versioned schema itself (and then set into the call context).

In operation 1008, the second procedure, invokes the third procedure using the first version context of the second procedure and the second version context of the third procedure. For example, the second procedure calls the third procedure and places the third procedure and the second version context into the call context. The second procedure provides the first version context and the second version context to the third procedure when the second procedure invokes the third procedure.

FIG. 10B is an activity diagram of another pinning process, in accordance with some examples.

In operation 1010, a first procedure executing on the data platform 102 calls a second procedure of a versioned application package.

In operation 1012, the first procedure looks in a call context for the version of the second procedure of the versioned application package.

In operation 1014, the first procedure determines if the version of the second procedure is in the call context.

In response to determining that the version of the second procedure of the versioned application instance is not in the call context, in operation 1016, the first procedure determines a current version of the versioned application instance and adds the current version to the call context as the version of the second procedure. In some examples, the first procedure determines the version of the versioned application package from an application instance registry. In some examples, the first procedure determines the version of the versioned application package from an object of the versioned application package.

In some examples, when the first procedure calls the second procedure, the second procedure inherits the version of the versioned application package that the first procedure determined.

If the second procedure of the versioned application package calls into another procedure of another versioned application package, as indicated by transition 1018, the process of determining a version of a versioned application package is repeated for the other versioned application package. Accordingly, the call context tracks multiple versions, one for each versioned application package that has been accessed in a call chain.

FIG. 11 illustrates another process flow diagram of a pinning or association process, in accordance with some examples. A compute service manager 104 uses an association process 1100 to determine a call context when an object of a schema is called or accessed by a procedure executing on the data platform 102. In accordance with the association process 1100, the compute service manager 104 does not store the versions of all applications found while compiling a procedure call. Instead, the compute service manager 104 stores the immediate application's version, and so does not guarantee that callbacks from other applications (or external procedures, or chains of both) will find the same versions. It only guarantees that queries see the same version of the application invoking them.

In operation 1102, a compute service manager 104 adds a map of known application versions to a call context. In some examples, the call context is placed alongside or within a dictionary cache, which is part of an SQL naming context of each thread-local call context instance.

In operation 1104, when the compute service manager 104 loads an application object, the compute service manager 104 determines if the application object has been loaded before based on the call context.

In operation 1106, the compute service manager 104 loads the application object based on a determination that a version of the application object has not been loaded before.

In operation 1108, the compute service manager 104 loads the previously loaded application object's version based on a determination that the application object has been loaded before. In some examples, a stored procedure child job initializer object captures the version of the application object whose procedure is being invoked. This is stored in a datastore before executing the procedure, and loaded again before compiling statements executed by the procedure. When loaded into a new call context, the stored procedure child job initializer object implicitly loads the procedure's schema. The application-version is captured and corrected in a case that a different version of the application object has been previously loaded and stored in the map for future loads.

In some examples, all known application versions are stored with a stored procedure child job initializer, such that the map in call context can be rebuilt when it is loaded.

Computer System

Figure 12:
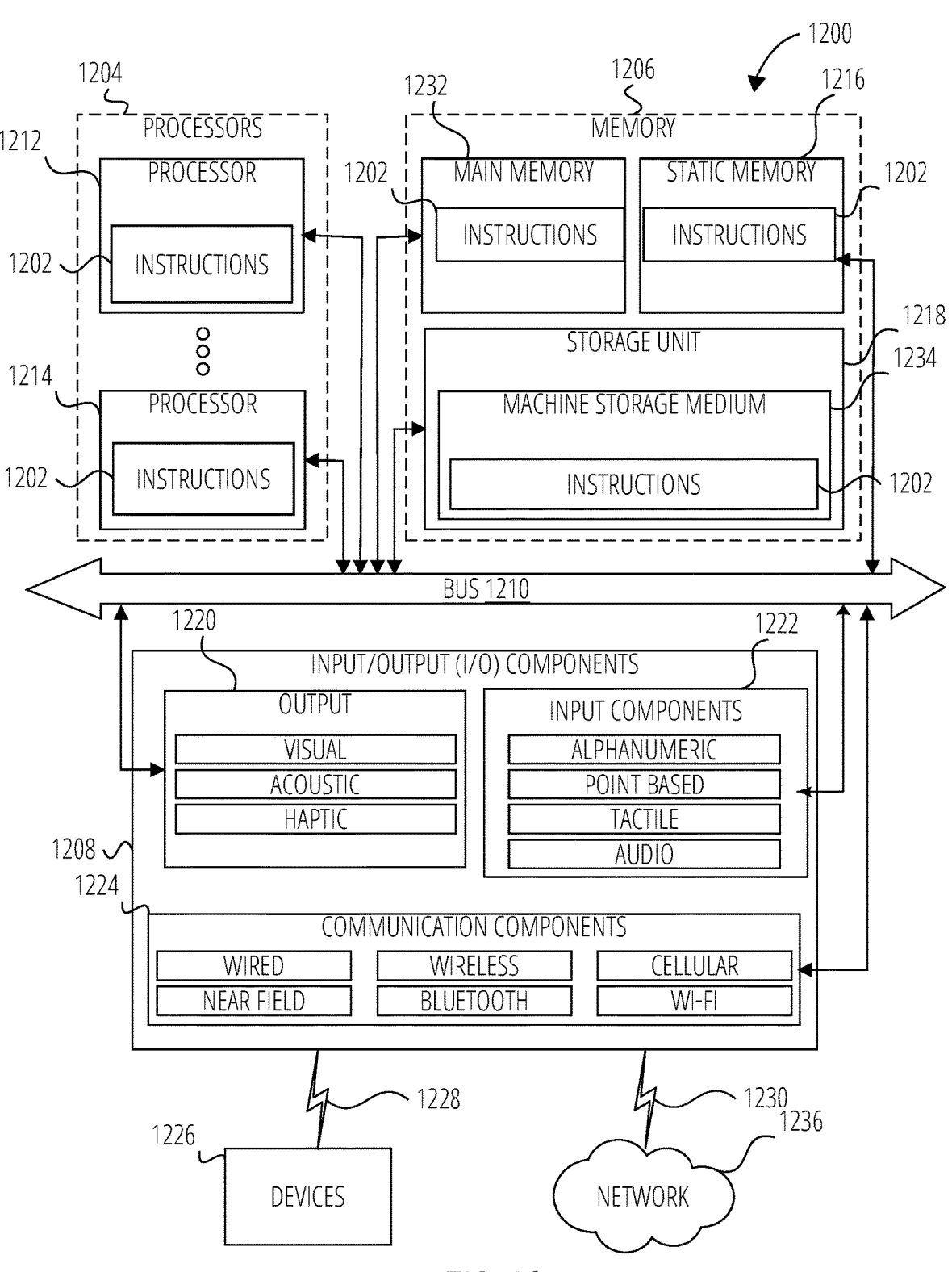
FIG. 12 illustrates a diagrammatic representation of a machine in the form of a computer system within which a set of instructions may be executed for causing the machine to perform any one or more of the methodologies discussed herein, in accordance with some examples.

FIG. 12 illustrates a diagrammatic representation of a machine 1200 in the form of a computer system within which a set of instructions may be executed for causing the machine 1200 to perform any one or more of the methodologies discussed herein, according to examples. Specifically, FIG. 12 shows a diagrammatic representation of the machine 1200 in the example form of a computer system, within which instructions 1202 (e.g., software, a program, an application, an applet, a data application, or other executable code) for causing the machine 1200 to perform any one or more of the methodologies discussed herein may be executed. For example, the instructions 1202 may cause the machine 1200 to execute any one or more operations of any one or more of the methods described herein. In this way, the instructions 1202 transform a general, non-programmed machine into a particular machine 1200 (e.g., the compute service manager 104, the execution platform 110, and the data storage devices 1 to N of data storage 106) that is specially configured to carry out any one of the described and illustrated functions in the manner described herein.

In alternative examples, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1202, sequentially or otherwise, that specify actions to be taken by the machine 1200. Further, while only a single machine 1200 is illustrated, the term "machine" shall also be taken to include a collection of machines that individually or jointly execute the instructions 1202 to perform any one or more of the methodologies discussed herein.

The machine 1200 includes processors 1204, memory 1206, and I/O components 1208 configured to communicate with each other such as via a bus 1210. In some examples, the processors 1204 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 1212 and a processor 1214 that may execute the instructions 1202. The term "processor" is intended to include multi-core processors that may comprise two or more independent processors (sometimes referred to as "cores") that may execute instructions 1202 contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory 1206 may include a main memory 1232, a static memory 1216, and a storage unit 1218 including a machine storage medium 1234, all accessible to the processors 1204 such as via the bus 1210. The main memory 1232, the static memory 1216, and the storage unit 1218 store the instructions 1202 embodying any one or more of the methodologies or functions described herein. The instructions 1202 may also reside, completely or partially, within the main memory 1232, within the static memory 1216, within the storage unit 1218, within at least one of the processors 1204 (e.g., within the processor's cache memory), or any suitable combination thereof, during execution thereof by the machine 1200.

The input/output (I/O) components 1208 include components to receive input, provide output, produce output, transmit information, exchange information, capture measurements, and so on. The specific I/O components 1208 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1208 may include many other components that are not shown in FIG. 12. The I/O components 1208 are grouped according to functionality merely for simplifying the following discussion and the grouping is in no way limiting. In various examples, the I/O components 1208 may include output components 1220 and input components 1222. The output components 1220 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1222 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1208 may include communication components 1224 operable to couple the machine 1200 to a network 1236 or devices 1226 via a coupling 1230 and a coupling 1228, respectively. For example, the communication components 1224 may include a network interface component or another suitable device to interface with the network 1236. In further examples, the communication components 1224 may include wired communication components, wireless communication components, cellular communication components, and other communication components to provide communication via other modalities. The devices 1226 may be another machine or any of a wide variety of peripheral devices (e.g., a peripheral device coupled via a universal serial bus (USB)). For example, as noted above, the machine 1200 may correspond to any one of the compute service manager 104, the execution platform 110, and the devices 1226 may include the data storage device 226 or any other computing device described herein as being in communication with the data platform 102 or the data storage 106.

The various memories (e.g., 1206, 1216, 1232, and/or memory of the processor(s) 1204 and/or the storage unit 1218) may store one or more sets of instructions 1202 and data structures (e.g., software) embodying or utilized by any one or more of the methodologies or functions described herein. These instructions 1202, when executed by the processor(s) 1204, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 1236 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1236 or a portion of the network 1236 may include a wireless or cellular network, and the coupling 1230 may be a Code Division Multiple Access (CDMA) connection, a Global System for Mobile communications (GSM) connection, or another type of cellular or wireless coupling. In this example, the coupling 1230 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1202 may be transmitted or received over the network 1236 using a transmission medium via a network interface device (e.g., a network interface component included in the communication components 1224) and utilizing any one of a number of well-known transfer protocols (e.g., hypertext transfer protocol (HTTP)). Similarly, the instructions 1202 may be transmitted or received using a transmission medium via the coupling 1228 (e.g., a peer-to-peer coupling) to the devices 1226. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1202 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method comprising:
creating an application package having a versioned schema, the versioned schema comprising a versioned container that automatically derives version information at creation time of the versioned container based on an application database container from which the versioned schema is being instantiated;
creating an application instance of the application package;
creating an application artifact role for the application instance, the application artifact role granting access to application artifacts of the application package;
creating a shared content role for the application instance, the shared content role granting access to shared content of the application package; and
granting privileges to the application artifact role and the shared content role to access objects of the application instance based on the versioned schema, the version information determining which privileges are granted to the application artifact role and the shared content role.

2. The machine-implemented method of claim 1, further comprising:
allowing access to application artifacts of a specific version of the application package based on the application artifact role.

3. The machine-implemented method of claim 1, further comprising:
allowing access to shared content of the application package during execution of the application instance based on the shared content role.

4. The machine-implemented method of claim 1, further comprising:
creating a user role for the application instance; and
granting privileges to the user role to execute objects of the application instance based on the versioned schema.

5. The machine-implemented method of claim 4, further comprising:

determining the privileges granted to the user role based on privileges granted to the user role by the versioned schema of the application package.

6. The machine-implemented method of claim 1, wherein the application artifact role, shared content role, and any additional roles created for the application instance are hidden roles that a user cannot modify.

7. The machine-implemented method of claim 1, wherein the privileges granted to the application artifact role and shared content role are configured by a developer of the application package.

8. The machine-implemented method of claim 1, further comprising:

receiving a request to upgrade the application instance to a new version of the application package; and updating, privileges granted to the application artifact role and shared content role based on the new version.

9. The machine-implemented method of claim 1, further comprising:

removing the application artifact role and shared content role in response to deleting the application instance from a data platform.

10. The machine-implemented method of claim 1, wherein the shared content accessed by the shared content role comprises data objects shared across multiple application instances.

11. A machine comprising:

at least one processor; and at least one memory storing instructions that, when executed by the at least one processor, cause the machine to perform operations comprising:

creating an application package having a versioned schema, the versioned schema comprising a versioned container that automatically derives version information at creation time of the versioned container based on an application database container from which the versioned schema is being instantiated;

creating an application instance of the application package;

creating an application artifact role for the application instance, the application artifact role granting access to application artifacts of the application package;

creating a shared content role for the application instance, the shared content role granting access to shared content of the application package; and granting privileges to the application artifact role and the shared content role to access objects of the application instance based on the versioned schema, the version information determining which privileges are granted to the application artifact role and the shared content role.

12. The machine of claim 11, wherein the operations further comprise:

allowing access to application artifacts of a specific version of the application package based on the application artifact role.

13. The machine of claim 11, wherein the operations further comprise:

allowing access to shared content of the application package during execution of the application instance based on the shared content role.

14. The machine of claim 11, wherein the operations further comprise:

creating a user role for the application instance; and granting privileges to the user role to execute objects of the application instance based on the versioned schema.

15. The machine of claim 14, wherein the operations further comprise:

determining the privileges granted to the user role based on privileges granted to the user role by the versioned schema of the application package.

16. The machine of claim 11, wherein the application artifact role, shared content role, and any additional roles created for the application instance are hidden roles that a user cannot modify.

17. The machine of claim 11, wherein the privileges granted to the application artifact role and shared content role are configured by a developer of the application package.

18. The machine of claim 11, wherein the operations further comprise:

receiving a request to upgrade the application instance to a new version of the application package; and updating, privileges granted to the application artifact role and shared content role based on the new version.

19. The machine of claim 11, wherein the operations further comprise:

removing the application artifact role and shared content role in response to deleting the application instance from a data platform.

20. The machine of claim 11, wherein the shared content accessed by the shared content role comprises data objects shared across multiple application instances.

21. A machine-storage medium storing instructions that, when executed by a machine, cause the machine to perform operations comprising:

creating an application package having a versioned schema, the versioned schema comprising a versioned container that automatically derives version information at creation time of the versioned container based on an application database container from which the versioned schema is being instantiated;

creating an application instance of the application package;

creating an application artifact role for the application instance, the application artifact role granting access to application artifacts of the application package;

creating a shared content role for the application instance, the shared content role granting access to shared content of the application package; and granting privileges to the application artifact role and the shared content role to access objects of the application instance based on the versioned schema, the version information determining which privileges are granted to the application artifact role and the shared content role.

22. The machine-storage medium of claim 21, wherein the operations further comprise:

allowing access to application artifacts of a specific version of the application package based on the application artifact role.

23. The machine-storage medium of claim 21, wherein the operations further comprise:

allowing access to shared content of the application package during execution of the application instance based on the shared content role.

24. The machine-storage medium of claim 21, wherein the operations further comprise:

creating a user role for the application instance; and granting privileges to the user role to execute objects of the application instance based on the versioned schema.

25. The machine-storage medium of claim 24, wherein the operations further comprise:

determining the privileges granted to the user role based on privileges granted to the user role by the versioned schema of the application package.

26. The machine-storage medium of claim 21, wherein the application artifact role, shared content role, and any additional roles created for the application instance are hidden roles that a user cannot modify.

27. The machine-storage medium of claim 21, wherein the privileges granted to the application artifact role and shared content role are configured by a developer of the application package.

28. The machine-storage medium of claim 21, wherein the operations further comprise:

receiving a request to upgrade the application instance to a new version of the application package; and updating, privileges granted to the application artifact role and shared content role based on the new version.

29. The machine-storage medium of claim 21, wherein the operations further comprise:

removing the application artifact role and shared content role in response to deleting the application instance from a data platform.

30. The machine-storage medium of claim 21, wherein the shared content accessed by the shared content role comprises data objects shared across multiple application instances.

\* \* \* \* \*